US012724388B2

(12) United States Patent
Kobayashi et al.

(10) Patent No.: US 12,724,388 B2
(45) Date of Patent: Sep. 1, 2026

(54) INFORMATION PROCESSING DEVICE, CONTROL DESIGN ASSISTANCE METHOD, AND RECORDING MEDIUM

(71) Applicant: INTER-UNIVERSITY RESEARCH INSTITUTE CORPORATION RESEARCH ORGANIZATION OF INFORMATION AND SYSTEMS, Tokyo (JP)

(72) Inventors: Tsutomu Kobayashi, Tokyo (JP); Rick Salay, Tokyo (JP); Ichiro Hasuo, Tokyo (JP); Krzysztof Czarnecki, Tokyo (JP); Fuyuki Ishikawa, Tokyo (JP); Shinya Katsumata, Tokyo (JP)

(73) Assignee: INTER-UNIVERSITY RESEARCH INSTITUTE CORPORATION RESEARCH ORGANIZATION OF INFORMATION AND SYSTEMS, Tokyo (JP)

( * ) Notice: Subject to any disclaimer, the term of this patent is extended or adjusted under 35 U.S.C. 154(b) by 405 days.

(21) Appl. No.: 18/509,831

(22) Filed: Nov. 15, 2023

(65) Prior Publication Data

US 2024/0085874 A1 Mar. 14, 2024

Related U.S. Application Data

(63) Continuation of application No. PCT/JP2022/021295, filed on May 24, 2022.

(30) Foreign Application Priority Data

May 25, 2021 (JP) ................................ 2021-087649

(51) Int. Cl.
*G05B 15/02* (2006.01)

(52) U.S. Cl.
CPC .................................. *G05B 15/02* (2013.01)

(58) Field of Classification Search
CPC ..................................................... G05B 15/02
(Continued)

(56) References Cited

U.S. PATENT DOCUMENTS

2015/0081048 A1* 3/2015 Tokito ................ G05B 19/0426 700/52
2020/0057416 A1* 2/2020 Matsubara ............ G06N 20/10
(Continued)

FOREIGN PATENT DOCUMENTS

CN 103279126 9/2013
JP H11-085211 3/1999
(Continued)

OTHER PUBLICATIONS

Extended European Search Report mailed on Aug. 22, 2024 with respect to the corresponding European patent application No. 22811336.1.

(Continued)

*Primary Examiner* — Md Azad
(74) *Attorney, Agent, or Firm* — IPUSA, PLLC

(57) ABSTRACT

An information processing device includes a memory, and a processor configured to execute a process. The process includes acquiring a first controller model, the first controller model including information indicating a control condition based on a measurement value, and information indicating a control action defining an action of a control target when the control condition is satisfied; and outputting a second controller model, the second controller model being capable of tolerating a measurement value including a measurement error, wherein the second controller model includes information indicating a control condition based on the information indicating the control condition included in
(Continued)

the first controller model, and information indicating a control action based on the information indicating the control condition and the information indicating the control action included in the first controller model.

12 Claims, 21 Drawing Sheets

(58) Field of Classification Search
USPC .............................................................. 700/29
See application file for complete search history.

(56) References Cited

U.S. PATENT DOCUMENTS

| | | | | |
|---|---|---|---|---|
| 2022/0006824 | A1 * | 1/2022 | Kakizaki | H04L 63/1425 |
| 2022/0107177 | A1 * | 4/2022 | Inoue | G01B 21/045 |
| 2023/0214717 | A1 * | 7/2023 | Hatakeyama | G06N 5/02<br>706/12 |
| 2024/0242009 | A1 * | 7/2024 | Jeong | G06F 30/27 |

FOREIGN PATENT DOCUMENTS

| | | |
|---|---|---|
| JP | 2002-169601 | 6/2002 |
| JP | 2017-210881 | 11/2017 |

OTHER PUBLICATIONS

Megyesi D et al: "Influence of the sensor error model on stability and controllability of a simple autopilot of a small unmanned aircraft", 2019 Modern Safety Technologids in Transportation (MOSATT), IEEE, Nov. 28, 2019 (Nov. 28, 2019), pp. 104-107, XP033681520.

Petkov Petko H. et al: "Design And Implementation Of Robust Control Laws", ECMS 2015 Proceedings Edited By: Valeri M. Mladenov, Petia Georgieva, Grisha Spasov, Galidiya Petrova, May 26, 2015 (May 26, 2015), pp. 1-13, XP093192800.

Changjian Zhang, David Garlan and Eunsuk Kang, 'A Behavioral Notion of Robustness for Software Systems', Proceedings of the 28th ACM Joint Meeting on European Software Engineering Conference and Symposium on the Foundations of Software Engineering (ESEC/FSE), from Nov. 8, 2020 to Nov. 13, 2020, in Sacramento, California, United States.

Shai Shalev-Shwartz, Shaked Shammah and Amnon Shashua, 'On a Formal Model of Safe and Scalable Self-driving Cars', Mobileye 2017, published on Oct. 27, 2018.

International Search Report for PCT/JP2022/021295 mailed on Aug. 9, 2022.

* cited by examiner

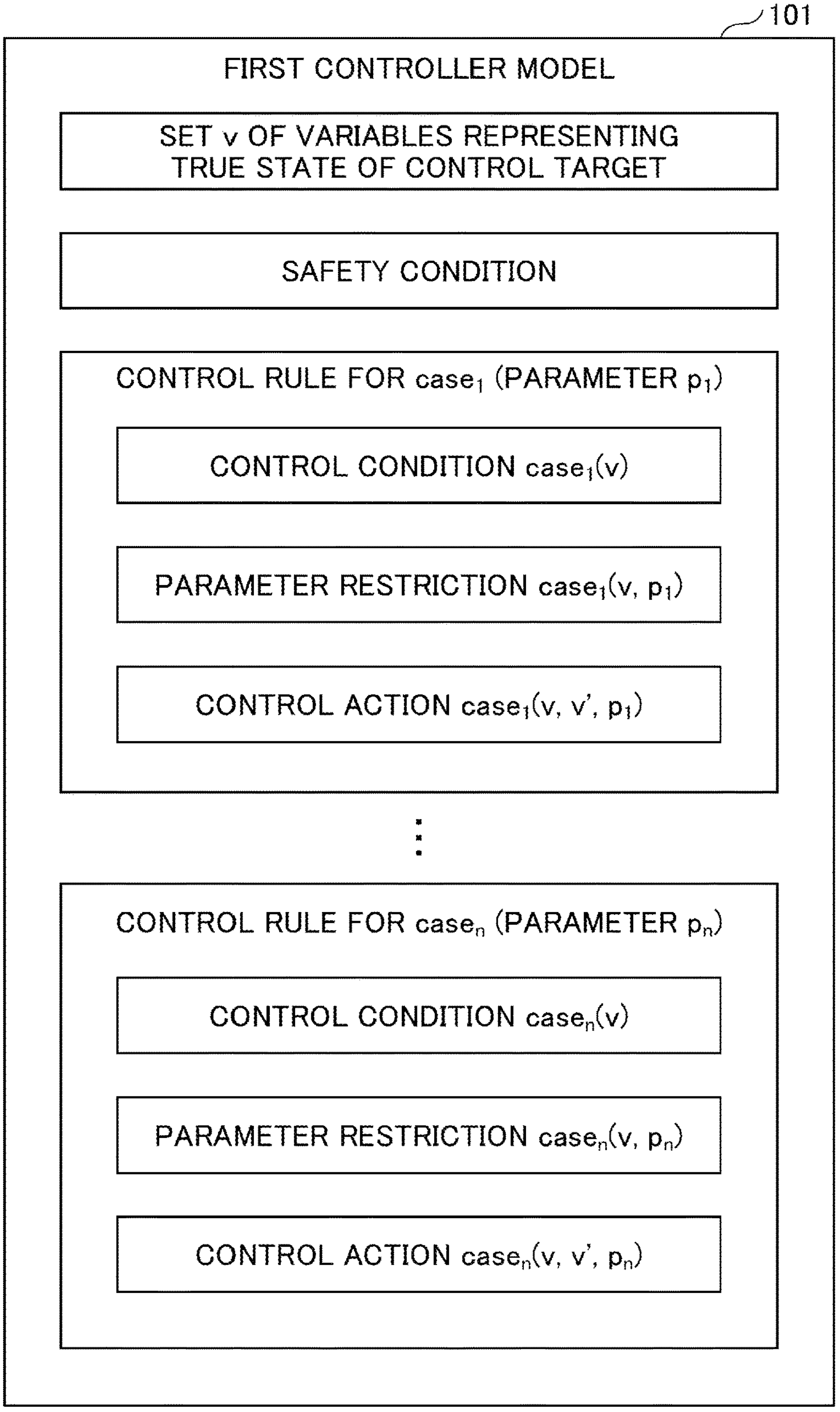

FIRST CONTROLLER MODEL

SET v OF VARIABLES REPRESENTING TRUE STATE OF CONTROL TARGET

SAFETY CONDITION

CONTROL RULE FOR $case_1$ (PARAMETER $p_1$)

CONTROL CONDITION $case_1(v)$

PARAMETER RESTRICTION $case_1(v, p_1)$

CONTROL ACTION $case_1(v, v', p_1)$

⋮

CONTROL RULE FOR $case_n$ (PARAMETER $p_n$)

CONTROL CONDITION $case_n(v)$

PARAMETER RESTRICTION $case_n(v, p_n)$

CONTROL ACTION $case_n(v, v', p_n)$

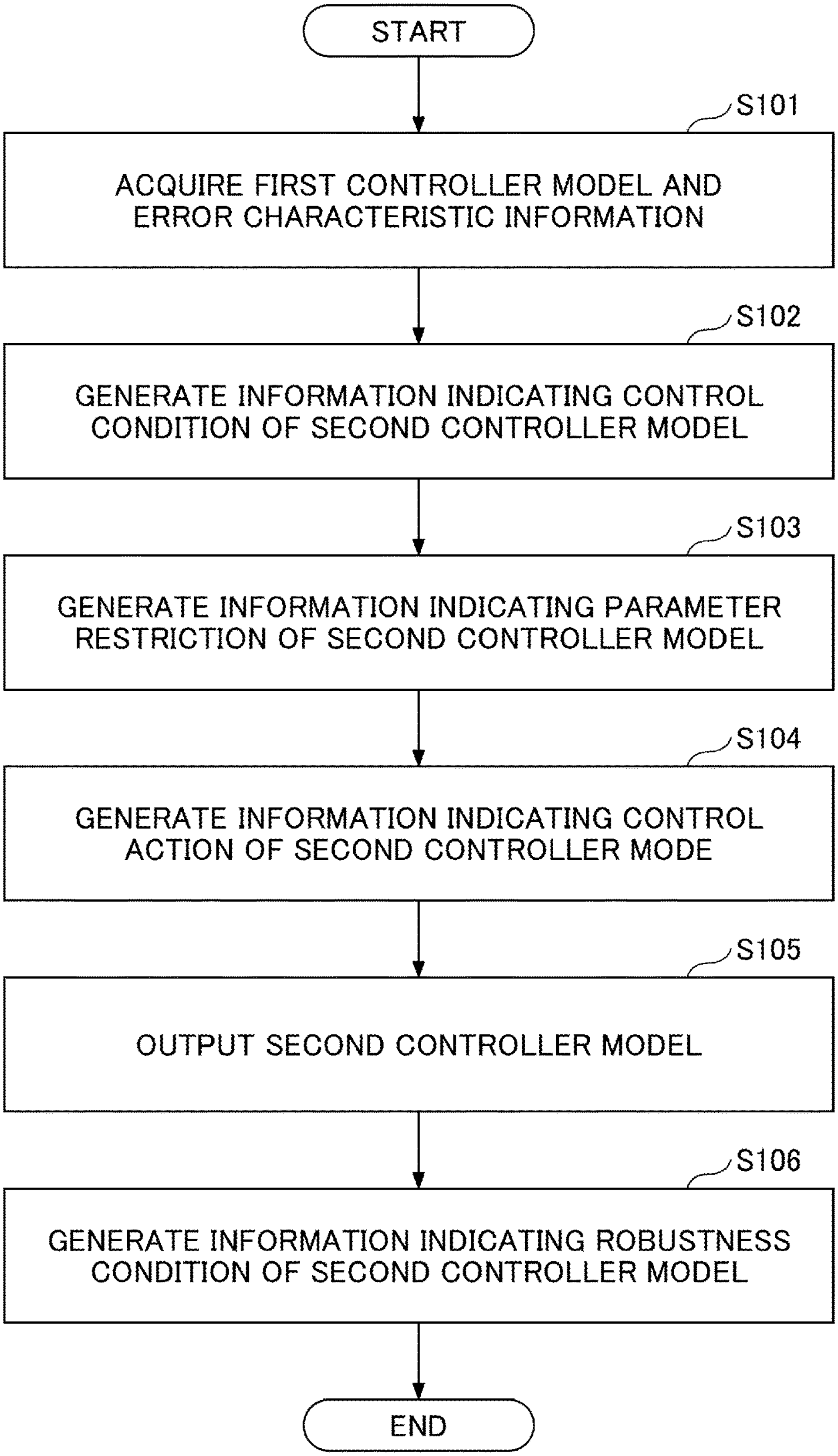

FIG.4

START

S101 ACQUIRE FIRST CONTROLLER MODEL AND ERROR CHARACTERISTIC INFORMATION

S102 GENERATE INFORMATION INDICATING CONTROL CONDITION OF SECOND CONTROLLER MODEL

S103 GENERATE INFORMATION INDICATING PARAMETER RESTRICTION OF SECOND CONTROLLER MODEL

S104 GENERATE INFORMATION INDICATING CONTROL ACTION OF SECOND CONTROLLER MODE

S105 OUTPUT SECOND CONTROLLER MODEL

S106 GENERATE INFORMATION INDICATING ROBUSTNESS CONDITION OF SECOND CONTROLLER MODEL

END

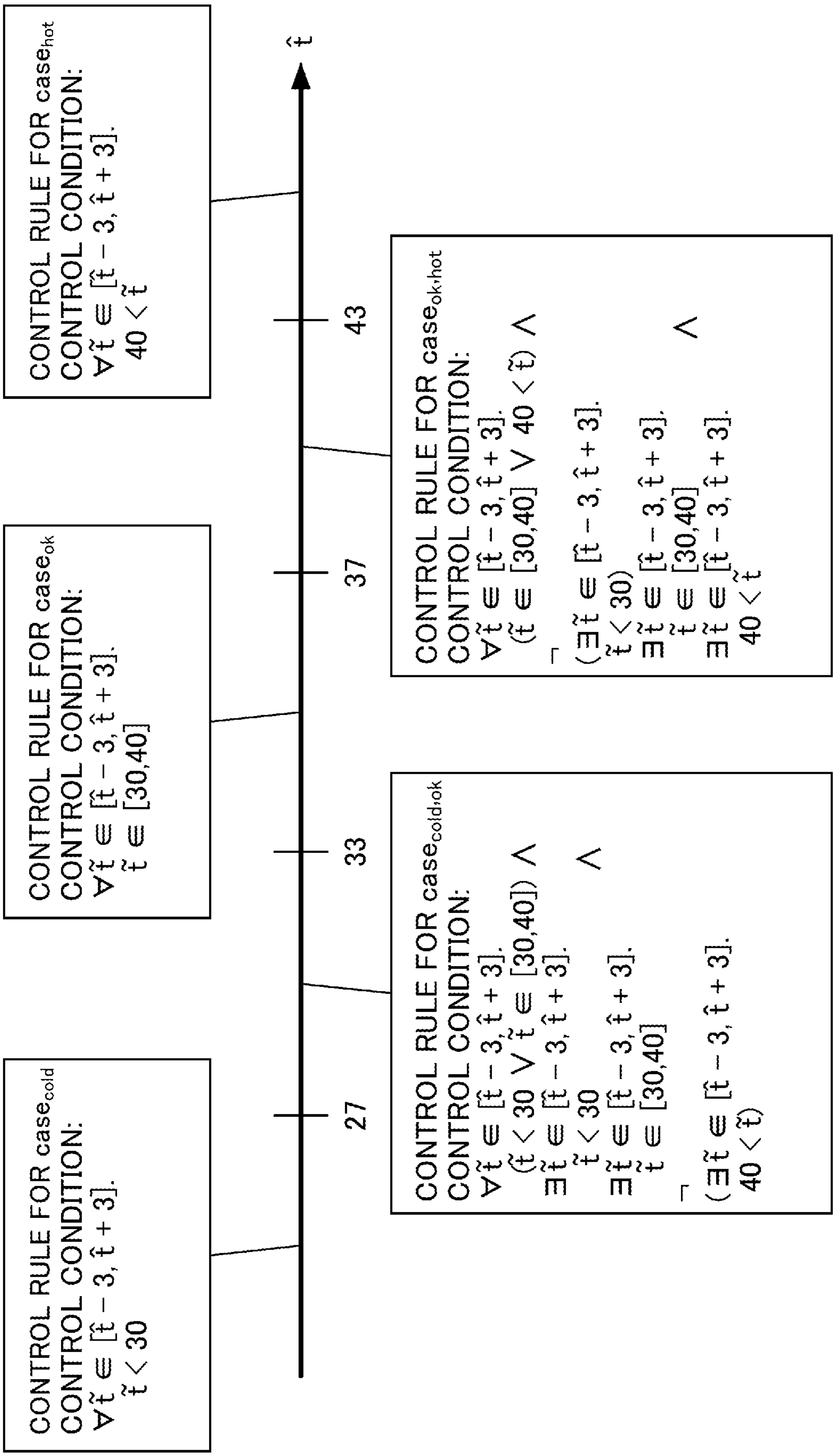

FIG.6

CONTROL RULE FOR $case_{cold}$
CONTROL CONDITION:
$\forall \tilde{t} \in [\hat{t} - 3, \hat{t} + 3].$
$\tilde{t} < 30$ CONTROL RULE FOR $case_{ok}$
CONTROL CONDITION:
$\forall \tilde{t} \in [\hat{t} - 3, \hat{t} + 3].$
$\tilde{t} \in [30,40]$ CONTROL RULE FOR $case_{hot}$
CONTROL CONDITION:
$\forall \tilde{t} \in [\hat{t} - 3, \hat{t} + 3].$
$40 < \tilde{t}$ 27 33 37 43 $\hat{t}$ CONTROL RULE FOR $case_{cold,ok}$
CONTROL CONDITION:
$\forall \tilde{t} \in [\hat{t} - 3, \hat{t} + 3].$
$(\tilde{t} < 30 \vee \tilde{t} \in [30,40]) \wedge$
$\exists \tilde{t} \in [\hat{t} - 3, \hat{t} + 3].$
$\tilde{t} < 30 \wedge$
$\exists \tilde{t} \in [\hat{t} - 3, \hat{t} + 3].$
$\tilde{t} \in [30,40]$
$\neg$
$(\exists \tilde{t} \in [\hat{t} - 3, \hat{t} + 3].$
$40 < \tilde{t})$ CONTROL RULE FOR $case_{ok,hot}$
CONTROL CONDITION:
$\forall \tilde{t} \in [\hat{t} - 3, \hat{t} + 3].$
$(\tilde{t} \in [30,40] \vee 40 < \tilde{t}) \wedge$
$\neg$
$(\exists \tilde{t} \in [\hat{t} - 3, \hat{t} + 3].$
$\tilde{t} < 30)$
$\exists \tilde{t} \in [\hat{t} - 3, \hat{t} + 3].$
$\tilde{t} \in [30,40] \wedge$
$\exists \tilde{t} \in [\hat{t} - 3, \hat{t} + 3].$
$40 < \tilde{t}$

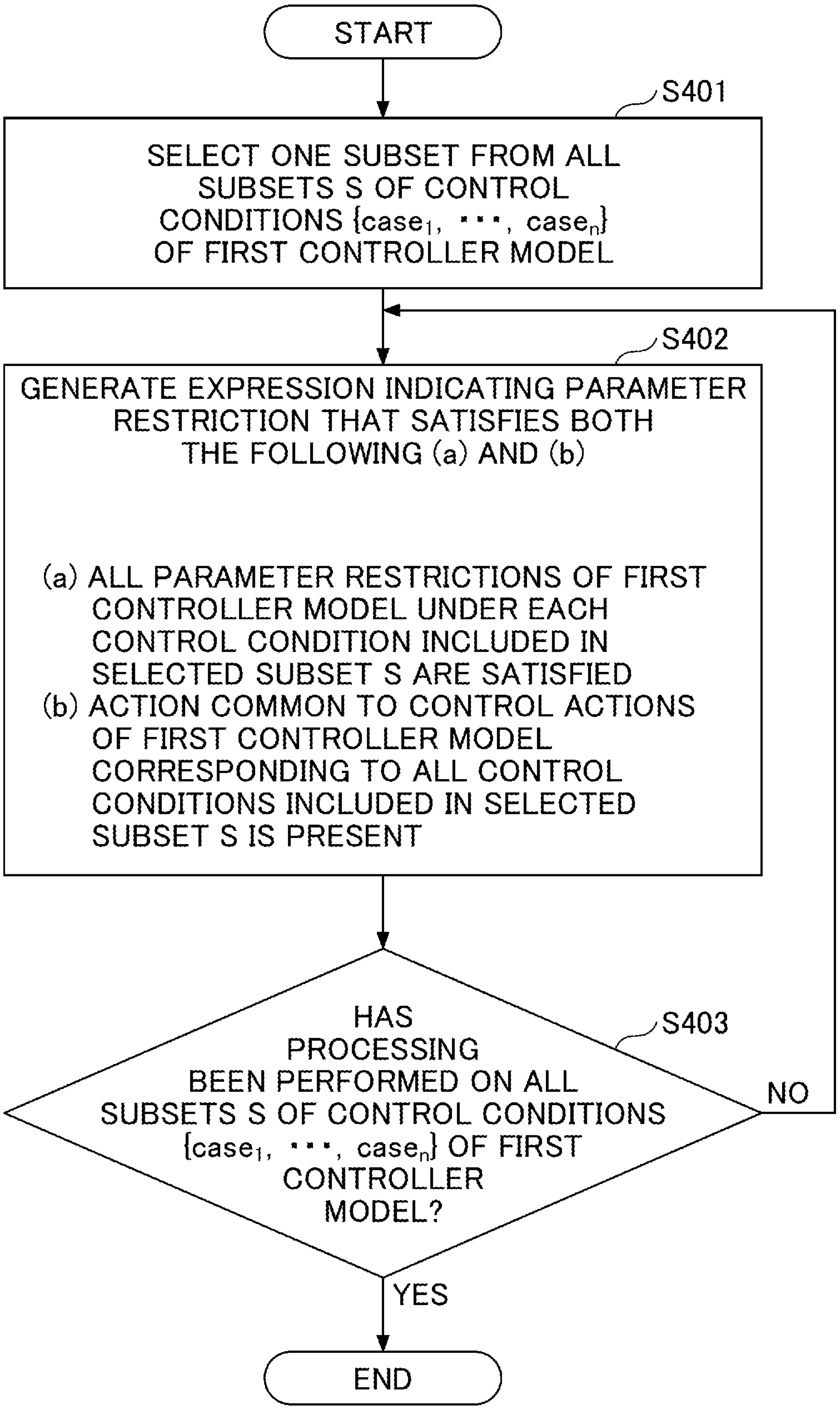

FIG.8
START
S401
SELECT ONE SUBSET FROM ALL SUBSETS S OF CONTROL CONDITIONS {$case_1$, ···, $case_n$} OF FIRST CONTROLLER MODEL
S402
GENERATE EXPRESSION INDICATING PARAMETER RESTRICTION THAT SATISFIES BOTH THE FOLLOWING (a) AND (b)
(a) ALL PARAMETER RESTRICTIONS OF FIRST CONTROLLER MODEL UNDER EACH CONTROL CONDITION INCLUDED IN SELECTED SUBSET S ARE SATISFIED
(b) ACTION COMMON TO CONTROL ACTIONS OF FIRST CONTROLLER MODEL CORRESPONDING TO ALL CONTROL CONDITIONS INCLUDED IN SELECTED SUBSET S IS PRESENT
S403
HAS PROCESSING BEEN PERFORMED ON ALL SUBSETS S OF CONTROL CONDITIONS {$case_1$, ···, $case_n$} OF FIRST CONTROLLER MODEL?
NO
YES
END

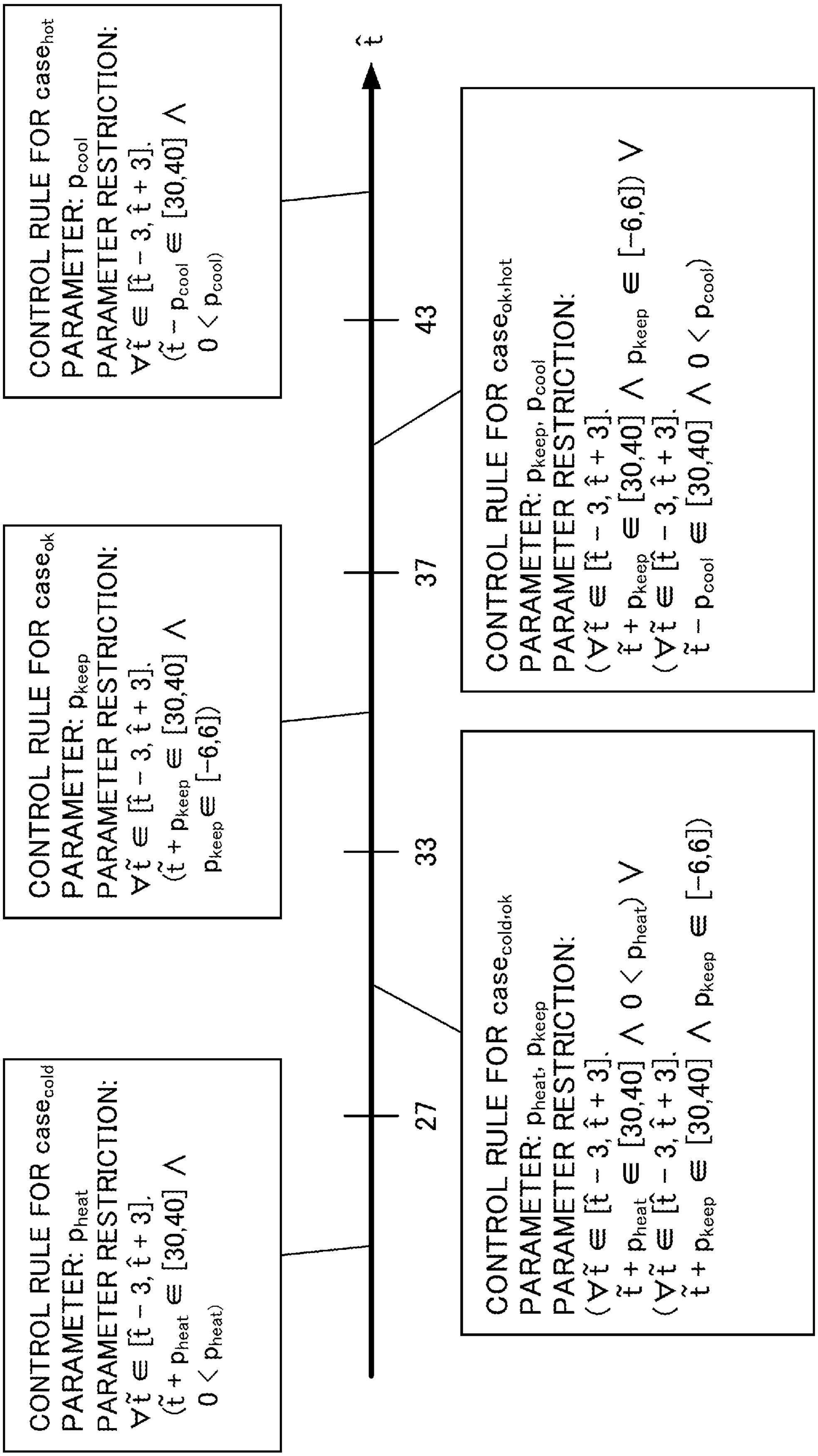

FIG.17

CONTROL RULE FOR $case_{cold}$
PARAMETER: $p_{heat}$
PARAMETER RESTRICTION:
$\forall \tilde{t} \in [\hat{t} - 3, \hat{t} + 3].$
$(\tilde{t} + p_{heat} \in [30,40] \wedge 0 < p_{heat})$ CONTROL RULE FOR $case_{ok}$
PARAMETER: $p_{keep}$
PARAMETER RESTRICTION:
$\forall \tilde{t} \in [\hat{t} - 3, \hat{t} + 3].$
$(\tilde{t} + p_{keep} \in [30,40] \wedge p_{keep} \in [-6,6])$ CONTROL RULE FOR $case_{hot}$
PARAMETER: $p_{cool}$
PARAMETER RESTRICTION:
$\forall \tilde{t} \in [\hat{t} - 3, \hat{t} + 3].$
$(\tilde{t} - p_{cool} \in [30,40] \wedge 0 < p_{cool})$ $\hat{t}$

27

33

37

43

CONTROL RULE FOR $case_{cold,ok}$
PARAMETER: $p_{heat}$, $p_{keep}$
PARAMETER RESTRICTION:
$(\forall \tilde{t} \in [\hat{t} - 3, \hat{t} + 3].$
$\tilde{t} + p_{heat} \in [30,40] \wedge 0 < p_{heat}) \vee$
$(\forall \tilde{t} \in [\hat{t} - 3, \hat{t} + 3].$
$\tilde{t} + p_{keep} \in [30,40] \wedge p_{keep} \in [-6,6])$ CONTROL RULE FOR $case_{ok,hot}$
PARAMETER: $p_{keep}$, $p_{cool}$
PARAMETER RESTRICTION:
$(\forall \tilde{t} \in [\hat{t} - 3, \hat{t} + 3].$
$\tilde{t} + p_{keep} \in [30,40] \wedge p_{keep} \in [-6,6]) \vee$
$(\forall \tilde{t} \in [\hat{t} - 3, \hat{t} + 3].$
$\tilde{t} - p_{cool} \in [30,40] \wedge 0 < p_{cool})$

INFORMATION PROCESSING DEVICE, CONTROL DESIGN ASSISTANCE METHOD, AND RECORDING MEDIUM

CROSS-REFERENCE TO RELATED APPLICATIONS

This U.S. non-provisional application is a continuation application of and claims the benefit of priority under 35 U.S.C. § 365 (c) from PCT International Application PCT/JP2022/021295 filed on May 24, 2022, which is designated the U.S., and is based upon and claims the benefit of priority to Japanese Patent Application No. 2021-087649 filed on May 25, 2021, the entire contents of which are incorporated herein by reference.

BACKGROUND OF THE INVENTION

1. Field of the Invention

The present invention relates to an information processing device, a control design assistance method, and a non-transitory computer-readable recording medium.

2. Description of the Related Art

Controllers have been developed to control targets based on the results of measurements by sensors and other devices. Therefore, a technique is known to guarantee the safety of the control target using a formal model.

For example, Non-Patent Document 1 discloses a method for calculating the abnormal action of a control target that the controller can tolerate for a controller model and a control target model expressed in "labeled transition systems".

RELATED ART DOCUMENTS

Non-Patent Documents

[Non-Patent Document 1] Zhang, C., Garlan, D., Kang, E.: A behavioral note of robustness for software systems. In: Proceedings of the 28th ACM Joint Meeting on European Software Engineering Conference and Symposium on the Foundations of Software Engineering (ESEC/FSE). pp. 1-12. ACM (2020).

[Non-Patent Document 2] Shalev-Shwartz et al., On a formal model of safe and scalable self-driving cars, arXiv: 1708.06374, 2017.

SUMMARY

According to a disclosed technology, an information processing device is provided. The information processing device includes:

a memory; and a processor configured to execute a process including:

acquiring a first controller model, the first controller model including information indicating a control condition based on a measurement value, and information indicating a control action defining an action of a control target when the control condition is satisfied; and outputting a second controller model, the second controller model being capable of tolerating a measurement value including a measurement error, wherein the second controller model includes information indicating a control condition based on the information indicating the control condition the included in first controller model, and information indicating a control action based on the information indicating the control condition and the information indicating the control action included in the first controller model.

BRIEF DESCRIPTION OF DRAWINGS

FIG. 2 is a diagram illustrating an example of a first controller model.

FIG. 4 is a flowchart illustrating an example of a flow of control design assistance processing.

FIG. 6 is a diagram illustrating a specific example of a generation result of a control condition.

FIG. 8 is a flowchart illustrating an example of a flow of parameter restriction generation processing according to a first embodiment.

FIG. 17 is a diagram illustrating a specific example of a parameter restriction generation result according to the second embodiment.

DESCRIPTION OF THE PREFERRED EMBODIMENTS

In the related-art technology, when measurement results contain errors, it is necessary to evaluate the measurement errors as abnormal action and construct a controller model through complex design work.

Thus, it is desirable to provide a controller model that can tolerate measurement errors.

According to the present disclosure, it is possible to provide controller models that can tolerate measurement errors.

First Embodiment

Hereinafter, embodiments of the present invention (present embodiments) will be described with reference to the drawings. The embodiments described below are merely examples, and the embodiments to which the present invention is applied are not limited to the following embodiments.

In the text of the main body of the present specification, "^" or "~", which is a circumflex accent over each character, is prefixed to each character for convenience of description. "^t" and "~t" are examples of such characters.

Figure 1:
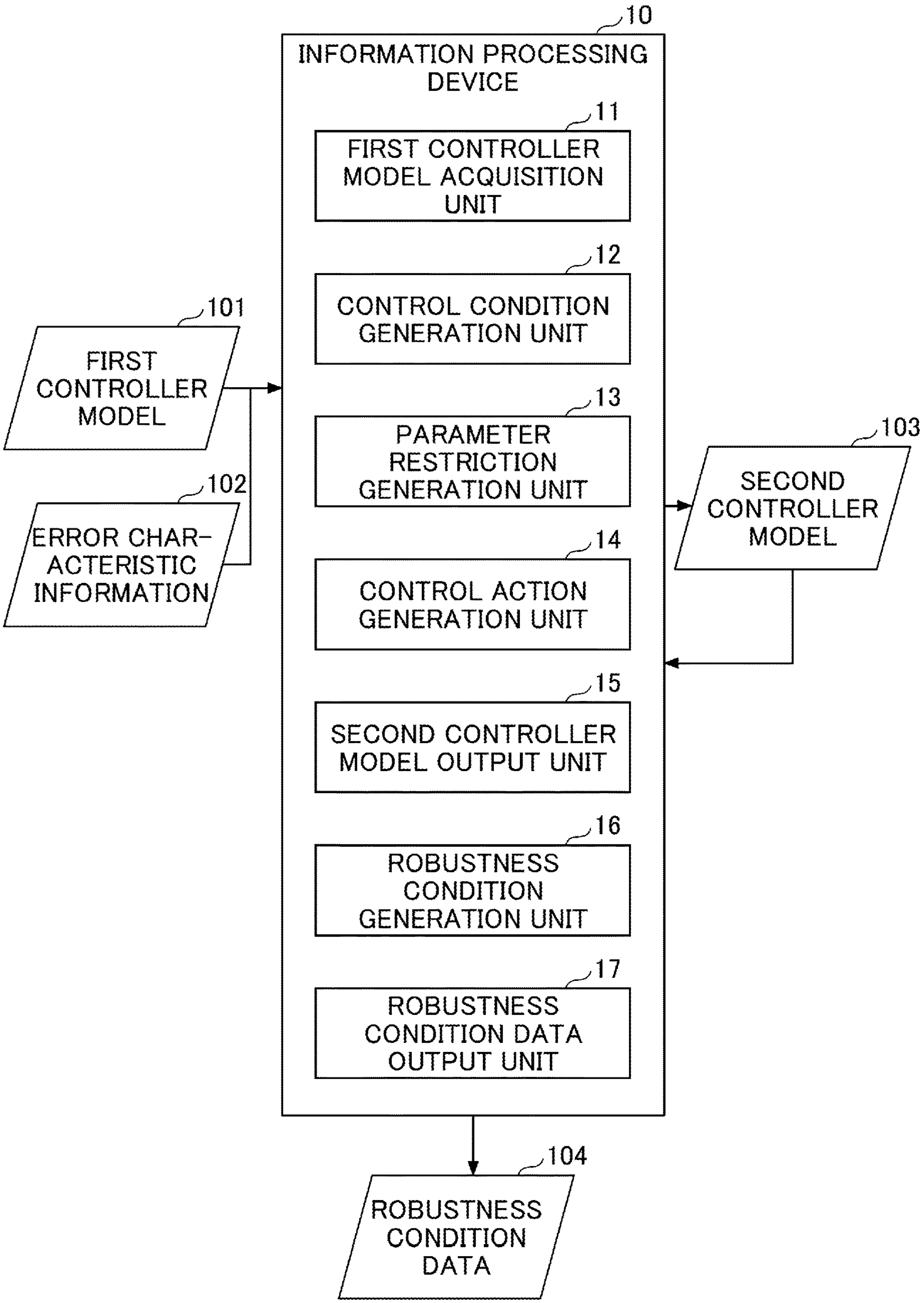
FIG. 1 is a functional configuration diagram illustrating an information processing device.

FIG. 1 is a functional configuration diagram illustrating an information processing device.

An information processing device 10 according to a present embodiment outputs a second controller model 103 and robustness condition data 104, based on a first controller model 101 and error characteristic information 102.

The first controller model 101 is a formal model that defines an action of a controller to control a control target based on a measurement result obtained by a sensor or the like. The first controller model 101 is a model that does not consider a measurement error generated by a sensor or the like. It is assumed that control conditions, parameter restrictions, and control actions stated in the first controller model 101 satisfy the safety condition described in the model.

The error characteristic information 102 is information indicating a characteristic of a measurement error. Specifically, the error characteristic information 102 is information indicating a relationship between a true value of a measurement target and a measurement value, which is information indicating the extent of measurement error. For example, an expression ($t \in [\hat{t}-3,\ \hat{t}+3]$) representing a relationship between the actual temperature t of the measurement target and the measurement value ^t is an example of the error characteristic information 102.

In this case, the error characteristic information 102 is information indicating a characteristic that the measurement error of the temperature t is within a range of ±3. Note that the error characteristic indicated by the error characteristic information 102 is not limited to a range of constant values, and may be a range of constant ratios, or may be a complex characteristic where the error range varies with the magnitude of the measurement value.

In addition, in the error characteristic information 102, the characteristic of the measurement error may be unknown, and in such a case, the error characteristic information 102 may not be given.

The second controller model 103 is a controller model in which a measurement error having a characteristic indicated by the error characteristic information 102 is considered based on the first controller model 101. Note that when the characteristic of the measurement error is unknown, the second controller model 103 is generated in a format in which information indicating the characteristic of the measurement error can be added later to the second controller model 103.

The first controller model 101 and the second controller model 103 include information indicating a safety condition, control conditions, parameter restrictions, and control actions. The safety condition is a condition of safety to be guaranteed, specifically, a condition to be satisfied by a result of control by an actual value to be measured. A safety condition of the second controller model 103 is a copy of that stated in the first controller model 101. The control condition is a condition under which each control action is executed. The parameter restriction is a condition to be satisfied by a parameter included in a content of a control action. The parameter restriction may be a condition for a parameter to satisfy the safety condition, or may be a condition stricter than the safety condition in a range in which the safety condition is satisfied.

The robustness condition data 104 is information indicating the robustness of the second controller model 103, and specifically, is data indicating a condition serving as a limit of a tolerable measurement error.

The information processing device 10 includes a first controller model acquisition unit 11, a control condition generation unit 12, a parameter restriction generation unit 13, a control action generation unit 14, a second controller model output unit 15, a robustness condition generation unit 16, and a robustness condition data output unit 17.

The first controller model acquisition unit 11 acquires the first controller model 101 and the error characteristic information 102. For example, the first controller model acquisition unit 11 may receive an input from a user or may receive an input from another device via a communication network or the like. In addition, the first controller model acquisition unit 11 may check whether or not the acquired first controller model 101 or error characteristic information 102 is appropriate, based on pre-defined criteria, and may acquire the first controller model 101 or the error characteristic information 102 when the acquired first controller model 101 or error characteristic information 102 is appropriate.

The control condition generation unit 12 generates information indicating a control condition of the second controller model 103 based on the first controller model 101 and the error characteristic information 102.

The parameter restriction generation unit 13 generates information indicating a parameter restriction for each control condition generated by the control condition generation unit 12 of the second controller model 103 based on the first controller model 101 and the error characteristic information 102.

The control action generation unit 14 generates information indicating a control action for each control condition generated by the control condition generation unit 12 of the second controller model 103 based on the first controller model 101 and the error characteristic information 102.

The second controller model output unit 15 outputs the second controller model 103 including information indicating the control condition of the generated second controller model 103, and information indicating the parameter restriction and the control action generated for the control condition. For example, the second controller model output unit 15 may display the second controller model 103 on a display device, or may transmit it to another device via a communication network or the like.

The robustness condition generation unit 16 generates the robustness condition data 104 for the second controller model 103, based on the generated information indicating the control condition and the parameter restriction of the second controller model 103. When the error characteristic information 102 is not given, that is, when the error characteristic is unknown, the robustness condition generation unit 16 generates the robustness condition data 104 indicating a condition that is a limit of the tolerable measurement error.

Note that the robustness condition generation unit 16 may generate the robustness condition data 104 even when the error characteristic information 102 is already given. In this case, it is possible to determine whether or not the given error characteristic is a measurement error that can be tolerated by the second controller model 103 by comparing the robustness condition data 104 with the given error characteristic.

The robustness condition data output unit 17 outputs the generated robustness condition data 104. For example, the robustness condition data output unit 17 may display the robustness condition data 104 on a display device or transmit it to another device via a communication network or the like.

FIG. 2 is a diagram illustrating an example of a first controller model.

The first controller model 101 includes a set v of variables representing a true state of a control target, a safety condition, and one or more control rules. Each control rule includes a control condition, a parameter restriction, and a control action. The control condition is denoted by a variable v. The parameter restrictions are denoted by v and $p_i$. The control actions are denoted by v and $p_i$, and a set v' of variables representing a state after control.

Figure 3:
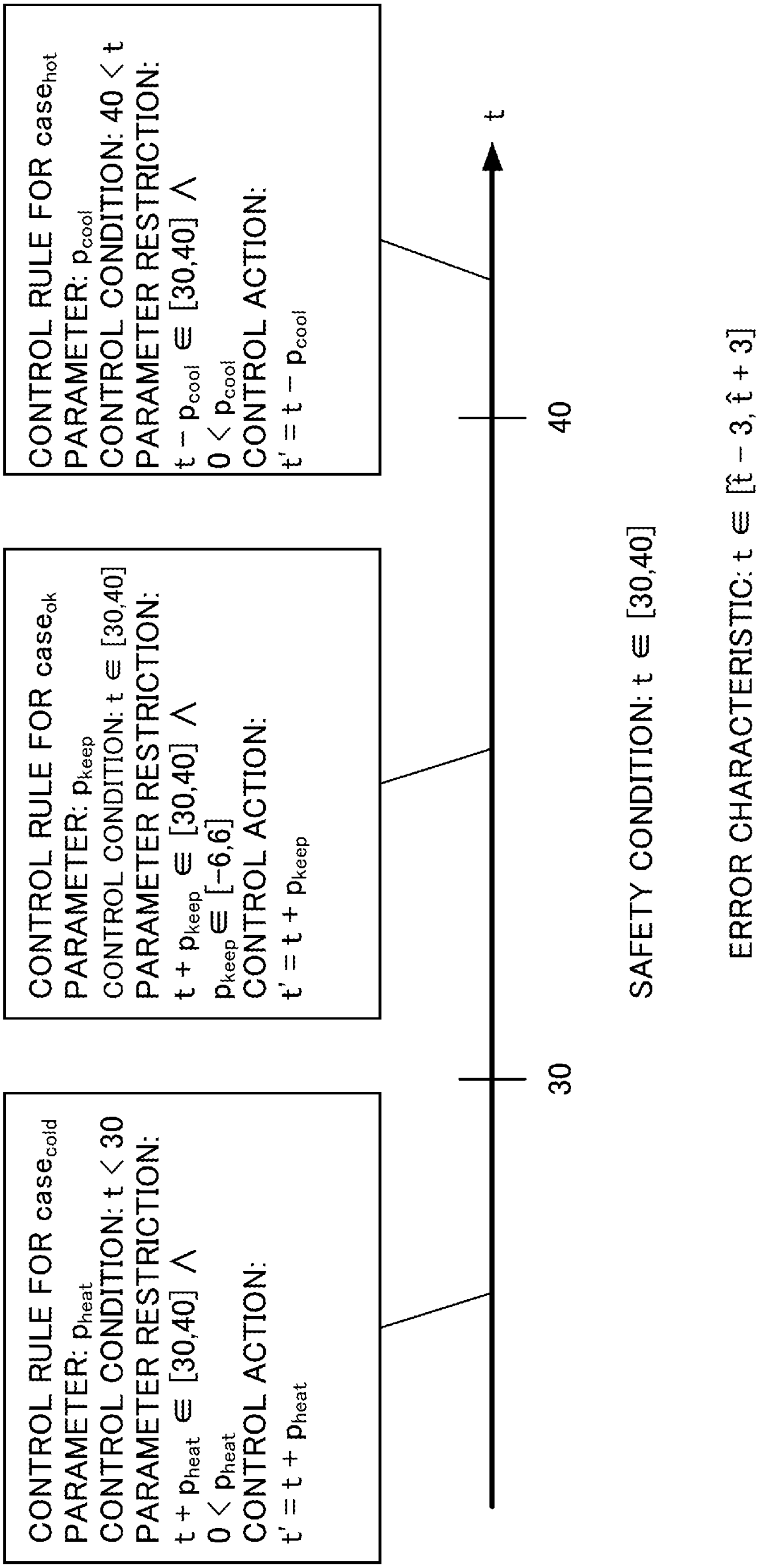
FIG. 3 is a diagram illustrating a specific example of the first controller model.

FIG. 3 is a diagram illustrating a specific example of the first controller model.

The specific example of the first controller model 101 illustrated in FIG. 3 is a model that measures the temperature of a hot spring bath having an unstable temperature and defines an action of the controller for heating or cooling based on the measurement result. The set v of variables indicating a state of the control target includes one variable of temperature t. The safety condition is a condition that the temperature t is maintained at 30° C. or more and 40° C. or less.

There are three control rules, and a first control rule for $case_{cold}$ illustrated in FIG. 3 is a rule that a control action $(t'=t+p_{heat})$ is executed when the temperature t satisfies a control condition of $t<30$, where the parameter $p_{heat}$ satisfies the parameter restriction $(t+p_{heat} \in [30, 40] \wedge 0<P_{heat})$.

A second control rule for $case_{ok}$ illustrated in FIG. 3 is a rule that a control action $(t'=t+p_{keep})$ is executed when the temperature t satisfies a control condition of $t \in [\mathbf{30},\mathbf{40}]$, where the parameter $p_{keep}$ satisfies the parameter restriction $(t+p_{keep} \in [30,40] \wedge p_{keep} \in [-6, 6])$.

A third control rule for $case_{hot}$ illustrated in FIG. 3 is a rule that a control action $(t'=t-P_{cool})$ is executed when the temperature t satisfies a control condition of $40<t$, where the parameter $p_{cool}$ satisfies the parameter restriction $(t-p_{cool} \in [30, 40] \wedge 0<p_{cool})$.

In addition, a specific example of the error characteristic information 102 is an error characteristic $(t \in [\hat{t}-3, \hat{t}+3])$. This indicates that the measurement error of the temperature t is within a range of ±3.

FIG. 4 is a flowchart illustrating an example of a flow of control design assistance processing.

When the information processing device 10 executes the control design assistance processing upon receiving a user's operation or the like, the information processing device 10 acquires the first controller model 101 and the error characteristic information 102 (step S101). The control condition generation unit 12 generates information indicating a control condition of the second controller model 103 (step S102).

Next, the parameter restriction generation unit 13 generates information indicating a parameter restriction of the second controller model 103 (step S103). Subsequently, the control action generation unit 14 generates information indicating a control action of the second controller model 103 (step S104).

The information processing device 10 outputs the second controller model 103 generated by the processing of steps S102 and S104 (step S105).

Next, the robustness condition generation unit 16 generates information indicating a robustness condition of the second controller model 103 (step S106). The information processing device 10 outputs the information indicating the generated robustness condition.

Figure 5:
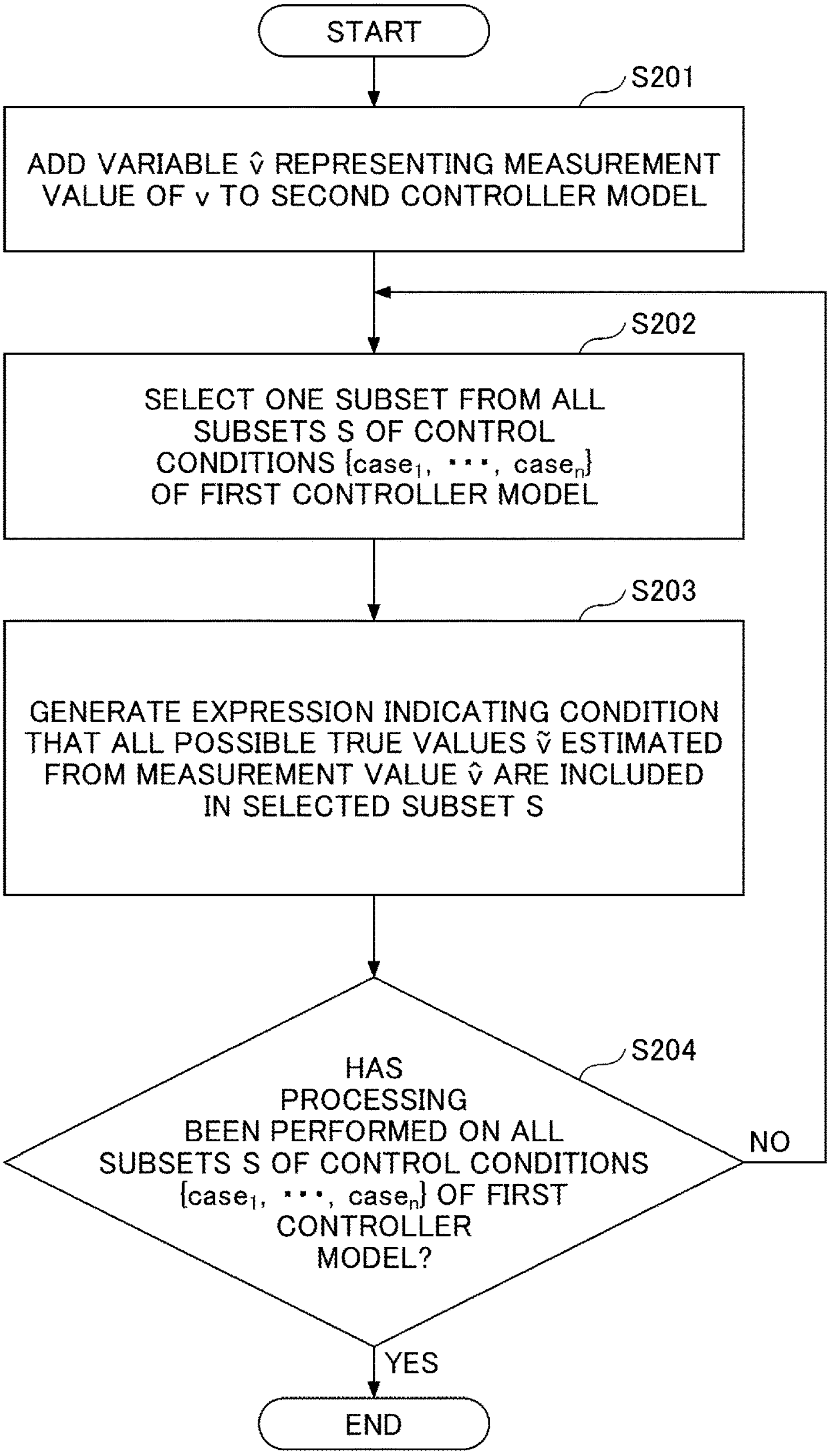
FIG. 5 is a flowchart illustrating an example of a flow of control condition generation processing.

FIG. 5 is a flowchart illustrating an example of a flow of control condition generation processing.

In step S102 of the control design assistance processing illustrated in FIG. 4, the control condition generation unit 12 executes the control condition generation processing. The control condition generation unit 12 adds a variable $\hat{v}$ representing the measurement value of v to the second controller model 103 (step S201). Hereinafter, the control conditions and parameter restrictions included in the second controller model 103 are defined by a variable $\hat{v}$.

Next, the control condition generation unit 12 selects one subset from all the subsets S of the control conditions $\{case_1, \ldots, case_n\}$ of the first controller model 101 (step S202). Specifically, a subset S is $\{case_1\}, \ldots, \{case_n\}, \{case_1, case_2\}, \{case_1, case_3\}, \ldots, \{case_1, case_n\}, \{case_1, case_2, case_3\}, \ldots$, and $\{case_1, case_2, \ldots, case_n\}$.

Next, the control condition generation unit 12 generates an expression indicating a condition that all possible true values $\tilde{v}$ estimated from the measurement value $\hat{v}$ are included in the selected subset S (step S203). However, the generated conditional expression does not include the range included in another subset S. Thus, the control condition generation unit 12 avoids generating an expression indicating a condition duplicated in a plurality of subsets S.

For example, in a case where the measurement value $\hat{v}$ of the temperature t is 30° C. in the first controller model 101 illustrated in FIG. 3, the error range is ±3° C., and thus a possible true value $\tilde{t}$ is in a range of 27° C. or more and 33° C. or less.

The control condition generation unit 12 generates an expression indicating a condition in which all possible true values $\tilde{t}$ are included in the selected subset S. For example, when the selected subset S is $\{case_{cold}\}$, the control condition generation unit 12 generates an expression "$\forall \tilde{t} \in [\hat{t}-3, \hat{t}+3] \cdot \tilde{t}<30$".

Next, the control condition generation unit 12 determines whether or not the processing has been performed on all the subsets S of $\{case_1, \ldots, case_n\}$ of the first controller model 101 (step S204). When the control condition generation unit 12 determines that the processing has not been performed on some subset S of $\{case_1, \ldots, case_n\}$ of the first controller model 101 (step S204: No), the control condition generation unit 12 returns to the processing of step S202, and selects a subset S that has not yet been selected.

When the control condition generation unit 12 determines that the processing has been performed on all the subsets S of $\{case_1, \ldots, case_n\}$ of the first controller model 101 (step S204: Yes), the control condition generation unit 12 ends the control condition generation processing.

As a result, an expression indicating a control condition of the second controller model 103 is generated for all the subsets S of $\{case_1, \ldots, case_n\}$ of the first controller model 101. Note that the control condition generation unit 12 may not include a subset S whose condition is not logically satisfied, among the expressions indicating the generated control conditions, in the second controller model 103. In this case, the parameter restriction generation unit 13 and the control action generation unit 14 may omit the processing on the subset S in the processing of generating the expressions indicating the parameter restriction and the control action to be described later.

For example, in the case of the first controller model 101 illustrated in FIG. 3, for the subset S of {$\text{case}_{cold}$, $\text{case}_{OK}$, $\text{case}_{hot}$}, an expression can be obtained indicating a control condition that all possible true values ~t estimated from the measurement value ˆv satisfy a condition included in the selected subset S, and there is no condition that does not include a range included in another subset ({$\text{case}_{cold}$, $\text{case}_{OK}$, $\text{case}_{hot}$}¥S). However, it is not possible that a range of #3 from a certain value ˆv applies over all of $\text{case}_{cold}$, $\text{case}_{OK}$, and $\text{case}_{hot}$. Therefore, the control condition generation unit 12, the parameter restriction generation unit 13, and the control action generation unit 14 may omit the processing on the subset S.

FIG. 6 is a diagram illustrating a specific example of a generation result of a control condition.

For example, an expression indicating a control condition of a control rule for $\text{case}_{\{ok,\ hot\}}$ is "∀~t∈[ˆt−3, ˆt+3]·(~t∈[30, 40]⋁40<~t)⋀¬∅~t∈[ˆt−3,ˆt+3]·~t<30⋀∃~t∈[ˆt−3, ˆt+3]·~t∈[30,40]⋀∅~t∈[ˆt−3,ˆt+3]·40<~t".

Figure 7:
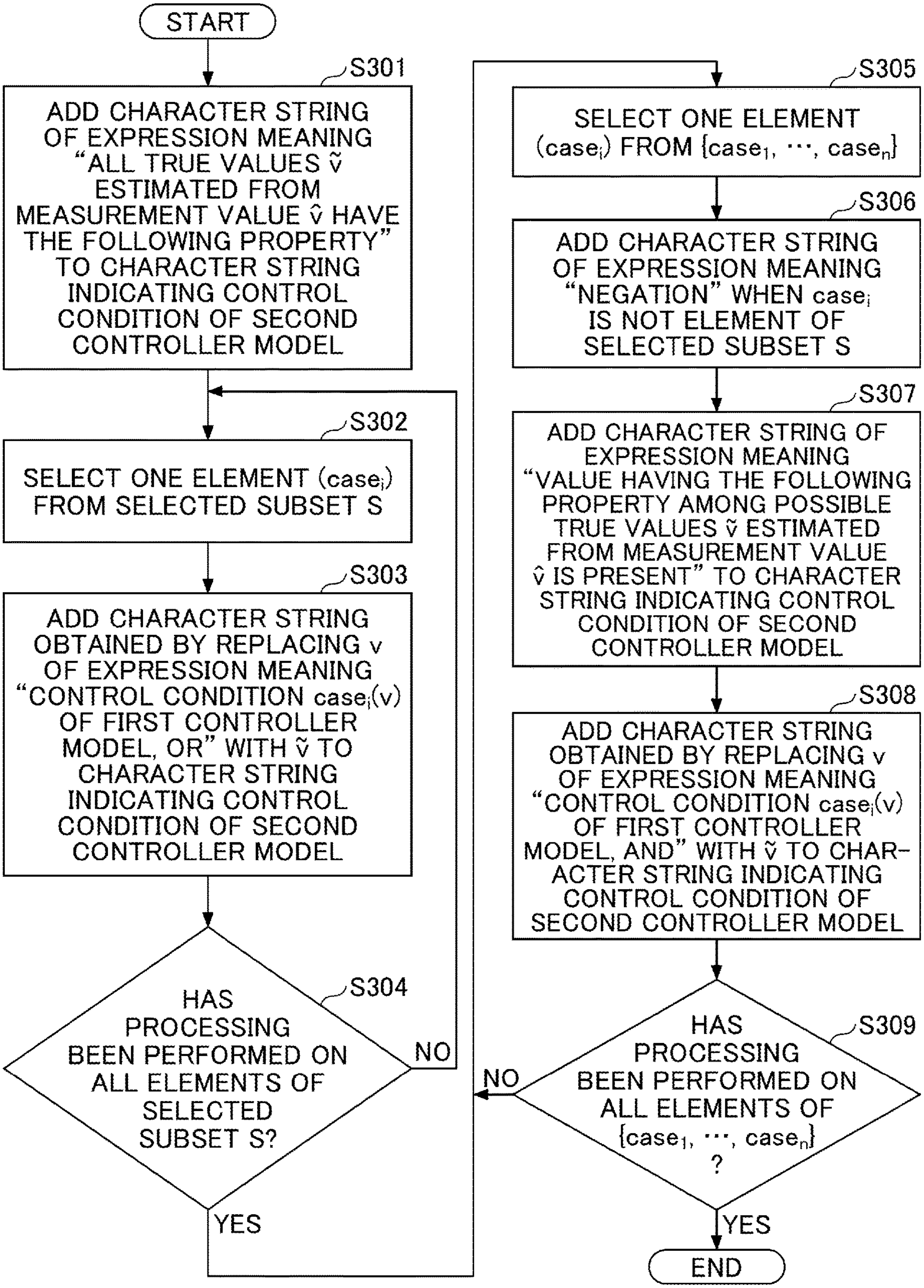
FIG. 7 is a flowchart illustrating an example of a flow of control condition character string generation processing.

FIG. 7 is a flowchart illustrating an example of a flow of control condition character string generation processing.

In step S203 of the control condition generation processing illustrated in FIG. 5, the control condition generation unit 12 executes control condition character string generation processing for generating a character string indicating a control condition.

The control condition generation unit 12 adds a character string of an expression meaning "all possible true values ~v estimated from the measurement value ˆv have the following property" to the character string indicating the control condition of the second controller model 103 (step S301). In the example of FIG. 6, the result of the processing in step S301 corresponds to a character string "∀~t∈[ˆt−3, ˆt+3]." included in the expression indicating the control condition of the control rule for $\text{case}_{\{ok,\ hot\}}$.

Next, the control condition generation unit 12 selects one element ($\text{case}_i$) from the selected subset S (step S302). For example, when the selected subset S is {$\text{case}_1$, $\text{case}_4$}, it has two elements $\text{case}_1$ and $\text{case}_4$.

Next, the control condition generation unit 12 adds a character string obtained by replacing v of the expression meaning "control condition $\text{case}_i$ (v) of the first controller model 101, or" with ~v to the character string indicating the control condition of the second controller model 103 (step S303). In the example of FIG. 6, the result of the processing of step S303 corresponds to the character string "~t=[30, 40]⋁" included in the expression indicating the control condition of the control rule for $\text{case}_{\{ok,\ hot\}}$. However, "or" is omitted when the processing of step S303 is executed last.

Next, the control condition generation unit 12 determines whether or not the processing has been performed on all the elements of the selected subset S (step S304). When the control condition generation unit 12 determines that the processing has not been performed on some element of the subset S (step S304: No), the control condition generation unit 12 returns to the processing of step S302 and selects an element that has not yet been selected from among the elements of the selected subset S.

When the control condition generation unit 12 determines that all the elements of the selected subset S have been processed (step S304: Yes), then the control condition generation unit 12 further selects one element ($\text{case}_i$) from all the cases {$\text{case}_1$, . . . , $\text{case}_n$} (step S305).

Subsequently, when $\text{case}_i$ is not an element of the selected subset S, a character string of an expression meaning "negation" is added (step S306). Thus, it is possible to explicitly state that the control condition is not included in the generated control condition.

Next, the control condition generation unit 12 adds a character string of an expression meaning "and a value having the following property among possible true values ~v estimated from the measurement value ˆv is present" to the character string indicating the control condition of the second controller model 103 (step S307). In the example of FIG. 6, the result of the processing in step S307 corresponds to a character string "⋀∃~t∈[ˆt−3, ˆt+3]~" included in the expression indicating the control condition of the control rule for $\text{case}_{\{ok,\ hot\}}$.

Next, the control condition generation unit 12 adds a character string obtained by replacing v of the expression meaning "the control condition $\text{case}_i$ (v) of the first control model, and" with ~v to the character string indicating the control condition of the second controller model 103 (step S308). In the example of FIG. 6, the result of the processing of step S308 corresponds to the character string "~t∈[30, 40]⋀" included in the expression indicating the control condition of the control rule for $\text{case}_{\{ok,\ hot\}}$. However, "and" is omitted when the processing of step S308 is executed last.

Next, the control condition generation unit 12 determines whether or not the processing has been performed on all the elements of {$\text{case}_1$, . . . , $\text{case}_n$} (step S309). When the control condition generation unit 12 determines that the processing has not been performed on some element of the subset S (step S309: No), the control condition generation unit 12 returns to the processing of step S305 and selects an element that has not been selected from {$\text{case}_1$, . . . , $\text{case}_n$}.

When the control condition generation unit 12 determines that all the elements of the selected subset S have been processed (step S309: Yes), the control condition generation unit 12 ends the control condition character string generation processing.

In this way, the control condition generation unit 12 can mechanically generate a character string indicating the control condition included in the second controller model 103 using the character string indicating the control condition included in the first controller model 101.

FIG. 8 is a flowchart illustrating an example of a flow of parameter restriction generation processing according to the first embodiment.

In step S103 of the control design assistance processing illustrated in FIG. 4, the parameter restriction generation unit 13 executes parameter restriction generation processing. The parameter restriction generation unit 13 selects one subset from all the subsets S of the control conditions {$\text{case}_1$, . . . , $\text{case}_n$} of the first controller model 101 (step S401).

Subsequently, the parameter restriction generation unit 13 generates an expression indicating a parameter restriction that satisfies both of the following (a) and (b) (step S402).

(a) All parameter restrictions of the first controller model 101 under each control condition included in the selected subset S are satisfied.

(b) an action common to the control actions of the first controller model 101 corresponding to all control conditions included in the selected subset S is present.

For example, when the selected subset S is $\{case_{cold}\}$, the parameter restriction generation unit 13 generates an expression "$\bigvee\tilde{t}\in[\hat{t}-3, \hat{t}+3]\cdot(\tilde{t}+p_{heat}\in[30, 40]\wedge 0<P_{heat})$".

Next, the parameter restriction generation unit 13 determines whether or not the processing has been performed on all the subsets S of $\{case_1, \ldots, case_n\}$ of the first controller model 101 (step S403). When the parameter restriction generation unit 13 determines that the processing has not been performed on some subset S of control conditions $\{case_1, \ldots, case_n\}$ of the first controller model 101 (step S403: No), the parameter restriction generation unit 13 returns to the processing of step S401 and selects a subset S that has not yet been selected.

When the parameter restriction generation unit 13 determines that the processing has been performed on all the subsets S of $\{case_1, \ldots, case_n\}$ of the first controller model 101 (step S403: Yes), the parameter restriction generation unit 13 ends the parameter restriction generation processing.

As a result, for all subsets S of $\{case_1, \ldots, case_n\}$ of the first controller model 101, expressions representing the parameter restrictions of the second controller model 103 are generated.

Figure 9:
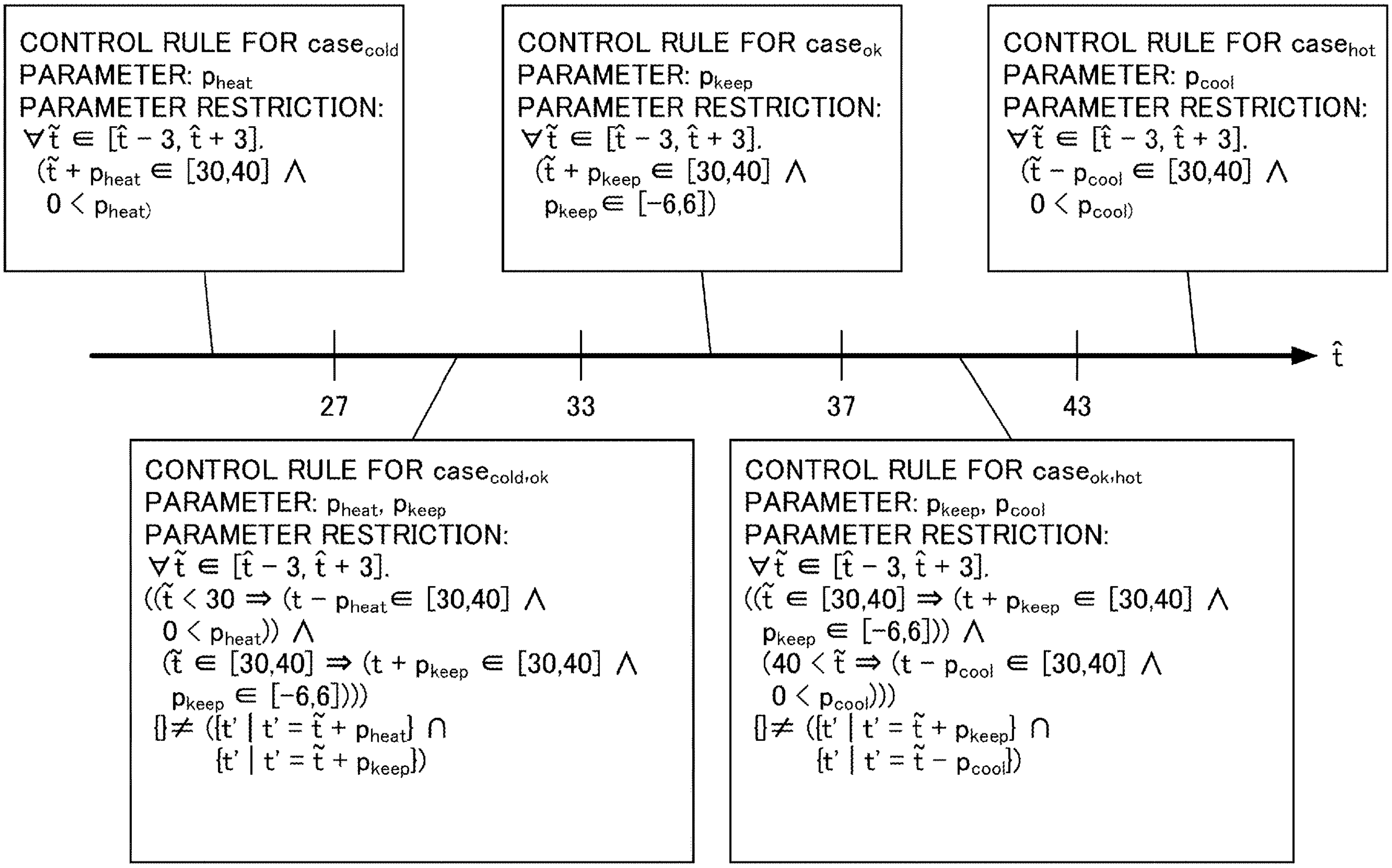
FIG. 9 is a diagram illustrating a specific example of a parameter restriction generation result according to the first embodiment.

FIG. 9 is a diagram illustrating a specific example of the generation result of the parameter restriction according to the first embodiment.

For example, the expression indicating the parameter restriction of the parameters ($P_{keep}$, $P_{cool}$) of the control rule for $case_{\{ok,\ hot\}}$ is: "$\bigvee\tilde{t}\in[\hat{t}-3, \hat{t}+3]\cdot((\tilde{t}\in[30, 40]\Rightarrow(t+p_{keep}\in[30, 40]\wedge p_{keep}\in[-6, 6]))\wedge(40<\cdot t\Rightarrow(t-p_{cppl}\in[30, 40]\wedge 0<p_{cool})))\wedge\{\ \}\neq(\{t'|t'=t+p_{keep}\}\bullet\{t'|t'=t-p_{cool}\})$".

Figure 10:
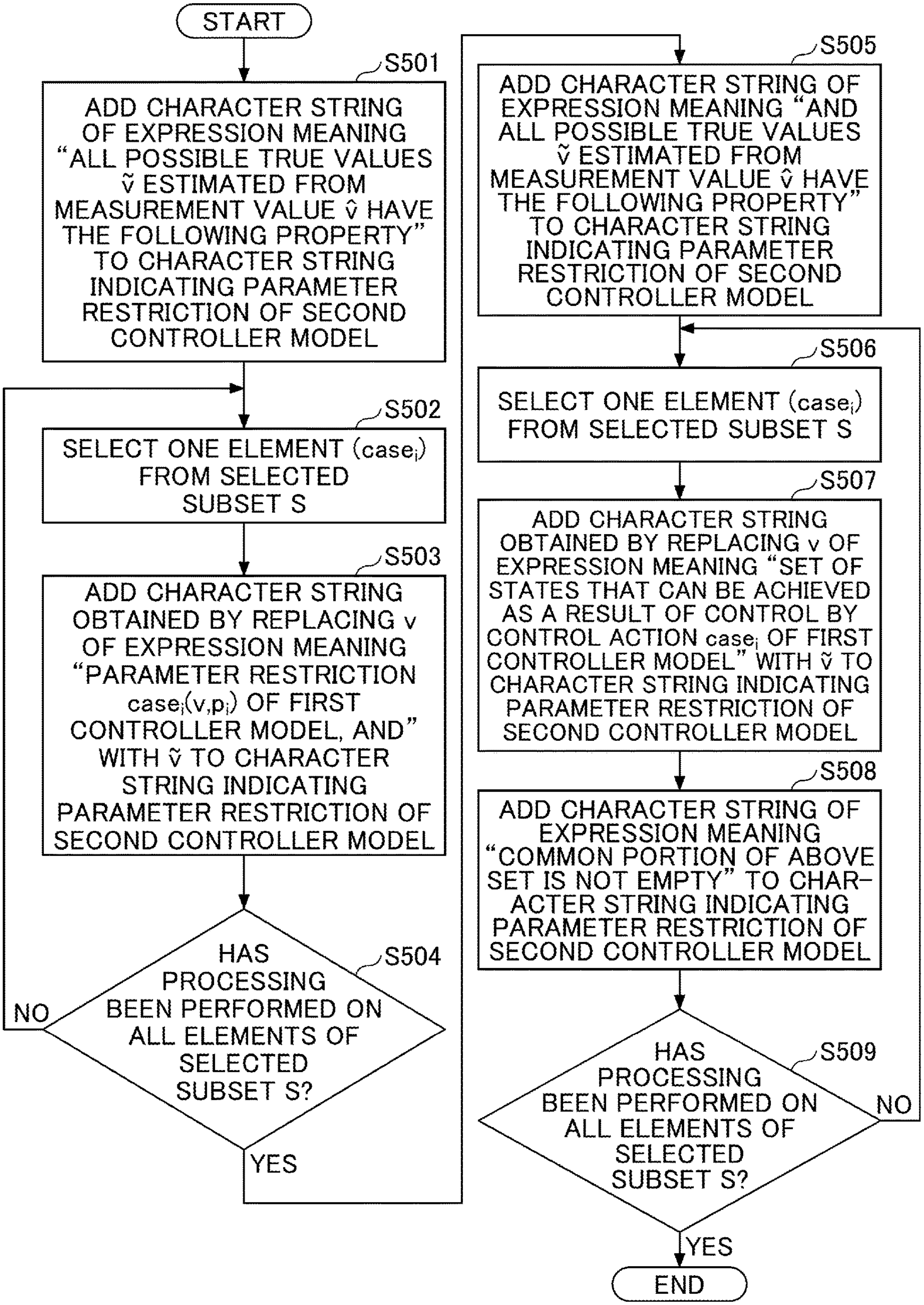
FIG. 10 is a flowchart illustrating an example of a flow of parameter restriction character string generation processing according to the first embodiment.

FIG. 10 is a flowchart illustrating an example of a flow of parameter restriction character string generation processing according to the first embodiment.

In the processing of step S402 of the parameter restriction generation processing illustrated in FIG. 8, the parameter restriction generation unit 13 executes parameter restriction character string generation processing for generating a character string indicating a parameter restriction.

The parameter restriction generation unit 13 adds a character string of an expression meaning "all possible true values ~v estimated from the measurement value ˆv have the following property" to the character string indicating the parameter restriction of the second controller model 103 (step S501). In the example of FIG. 9, the result of the processing of step S501 corresponds to a character string "$\bigvee\tilde{t}\in[\hat{t}-3, \hat{t}+3]$." included in the expression indicating the control condition of the control rule for $case_{\{ok,\ hot\}}$.

Next, the parameter restriction generation unit 13 selects one element ($case_i$) from the selected subset S (step S502).

Next, the parameter restriction generation unit 13 adds a character string obtained by replacing v of the expression meaning "parameter $case_i$ (v, $p_i$) of the first controller model 101, and" with ~v to a character string indicating the parameter restriction of the second controller model 103 (step S503). As a result of the processing in step S503, in the example of FIG. 9, the character string "$(t+p_{keep}\in[30, 40]\wedge p_{keep}\in[-6, 6])\wedge$" included in the expression indicating the control condition of the control rule for $case_{\{ok,\ hot\}}$ corresponds to the added character string related to $case_{ok}$ in S=$\{case_{ok}, case_{hot}\}$. However, "and" is omitted when the processing of step S503 is executed last.

Next, the parameter restriction generation unit 13 determines whether or not the processing has been performed on all the elements of the selected subset S (step S504). When the parameter restriction generation unit 13 determines that the processing has not been performed on some element of the subset S (step S504: No), the parameter restriction generation unit 13 returns to the processing of step S502 and selects an element that has not been selected yet from among the elements of the selected subset S.

When the parameter restriction generation unit 13 determines that all the elements of the selected subset S have been processed (step S504: Yes), the parameter restriction generation unit 13 adds a character string of an expression meaning "and all possible true values ~v estimated from the measurement value ˆv have the following property" to the character string indicating the parameter restriction of the second controller model 103 (step S505). In the example of FIG. 9, the result of the processing of step S505 corresponds to a character string "$\{\ \}\neq(\{t'|t'=t+p_{keep}\}\cap\{t'|t'=t-p_{cool}\})$" included in the expression indicating the control condition of the control rule for $case_{\{ok,\ hot\}}$.

Next, the parameter restriction generation unit 13 selects one element ($case_i$) from the selected subset S (step S506).

Subsequently, the parameter restriction generation unit 13 adds a character string obtained by replacing v of an expression meaning "a set of states that can be achieved as a result of control by the control action $case_i$ of the first controller model 101" with ~v to the character string indicating the parameter restriction of the second controller model 103 (step S507).

Further, the parameter restriction generation unit 13 adds a character string of an expression meaning "a common portion of the above set is not empty" to the character string indicating the parameter restriction of the second controller model 103 (step S508). In the example of FIG. 9, the result of the processing of step S507 and step S508 corresponds to a character string "$\{\ \}\neq(\{t'|t'=t+p_{keep}\}\cap\{t'|t'=t-p_{cool}\})$" 0 included in the expression indicating the control condition of the control rule for $case_{ok,hot}$.

Next, the parameter restriction generation unit 13 determines whether or not the processing has been performed on all the elements of the selected subset S (step S509). When the parameter restriction generation unit 13 determines that the processing has not been performed on some element of the subset S (step S509: No), the parameter restriction generation unit 13 returns to the processing of step S506 and selects an element that has not been selected from the selected subset S.

Or, when the parameter restriction generation unit 13 determines that all the elements of the selected subset S have been processed (step S509: Yes), the parameter restriction generation unit 13 ends the parameter restriction character string generation processing.

Figure 11:
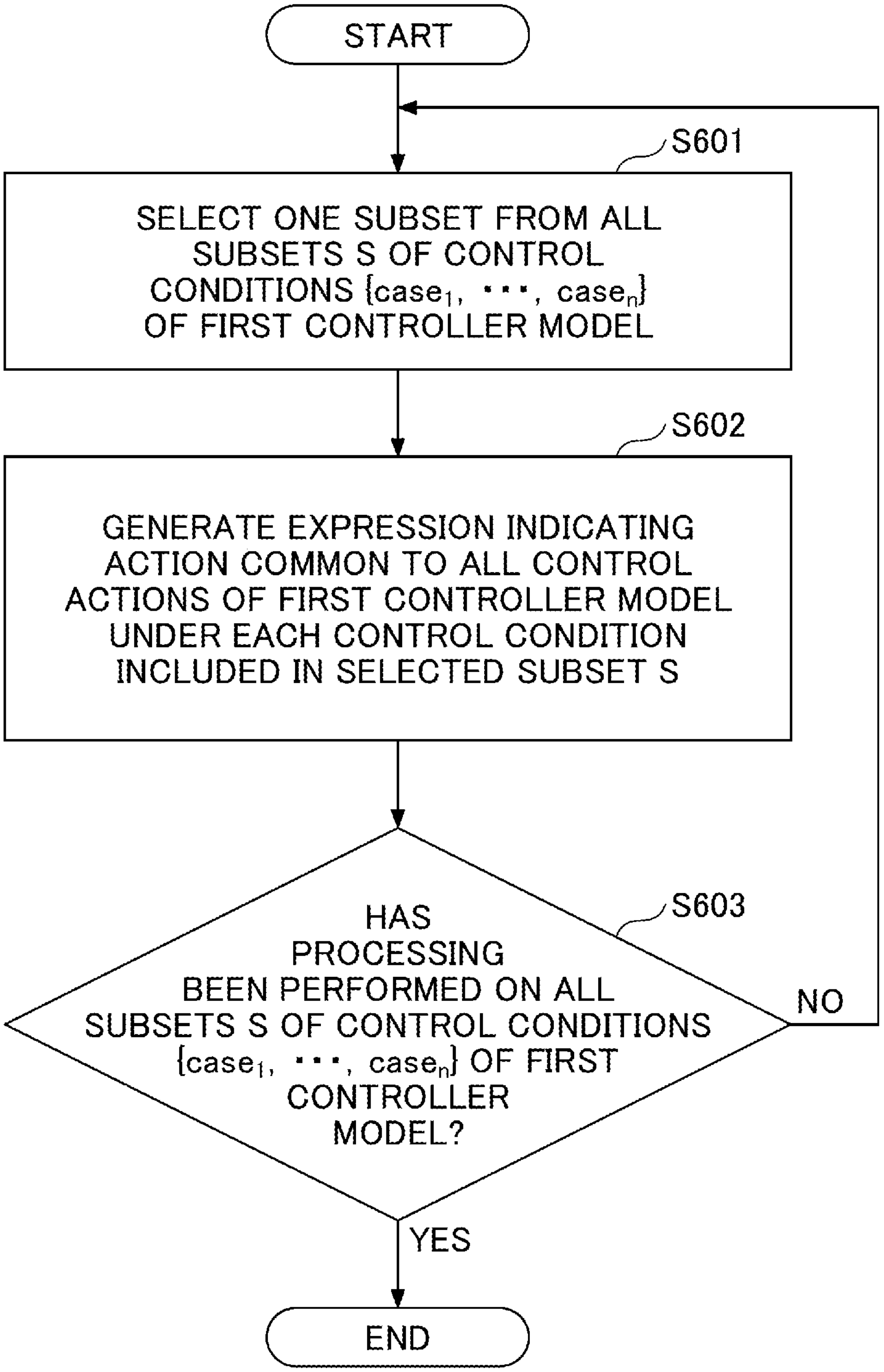
FIG. 11 is a flowchart illustrating an example of a flow of control action generation processing according to the first embodiment.

In this way, the parameter restriction generation unit 13 can mechanically generate the character string indicating the parameter restriction included in the second controller model 103 using the character string indicating the parameter restriction, the control action, or the like included in the first controller model 101. FIG. 11 is a flowchart illustrating an example of a flow of control action generation processing according to the first embodiment.

In step S104 of the control design assistance processing illustrated in FIG. 4, the control action generation unit 14 executes control action generation processing. The control action generation unit 14 selects one subset from all the subsets S of the control conditions $\{case_1, \ldots, case_n\}$ of the first controller model 101 (step S601).

Subsequently, the control action generation unit 14 generates an expression indicating an action common to all the control actions of the first controller model 101 under each control condition included in the selected subset S (step S602).

For example, when the selected subset S is $\{case_{cold}\}$, the control action generating unit 14 generates an expression "$t'=t+p_{heat}$". Next, the control action generation unit 14 determines whether or not the processing has been performed on all the subsets S of $\{case_1, \ldots, case_n\}$ of the first controller model 101 (step S603). When the control action generation unit 14 determines that the processing has not been performed on some subset S of $\{case_1, \ldots, case_n\}$ of the first controller model 101 (step S603: No), the control action generation unit 14 returns to the processing of step S601 and selects a subset S that has not yet been selected.

When the control action generation unit 14 determines that the processing has been performed on all the subsets S of $\{case_1, \ldots, case_n\}$ of the first controller model 101 (step S603: Yes), the control action generation unit 14 ends the control action generation processing.

As a result, an expression indicating the control action of the second controller model 103 is generated for all subsets S of $\{case_1, \ldots, case_n\}$ of the first controller model 101.

Figure 12:
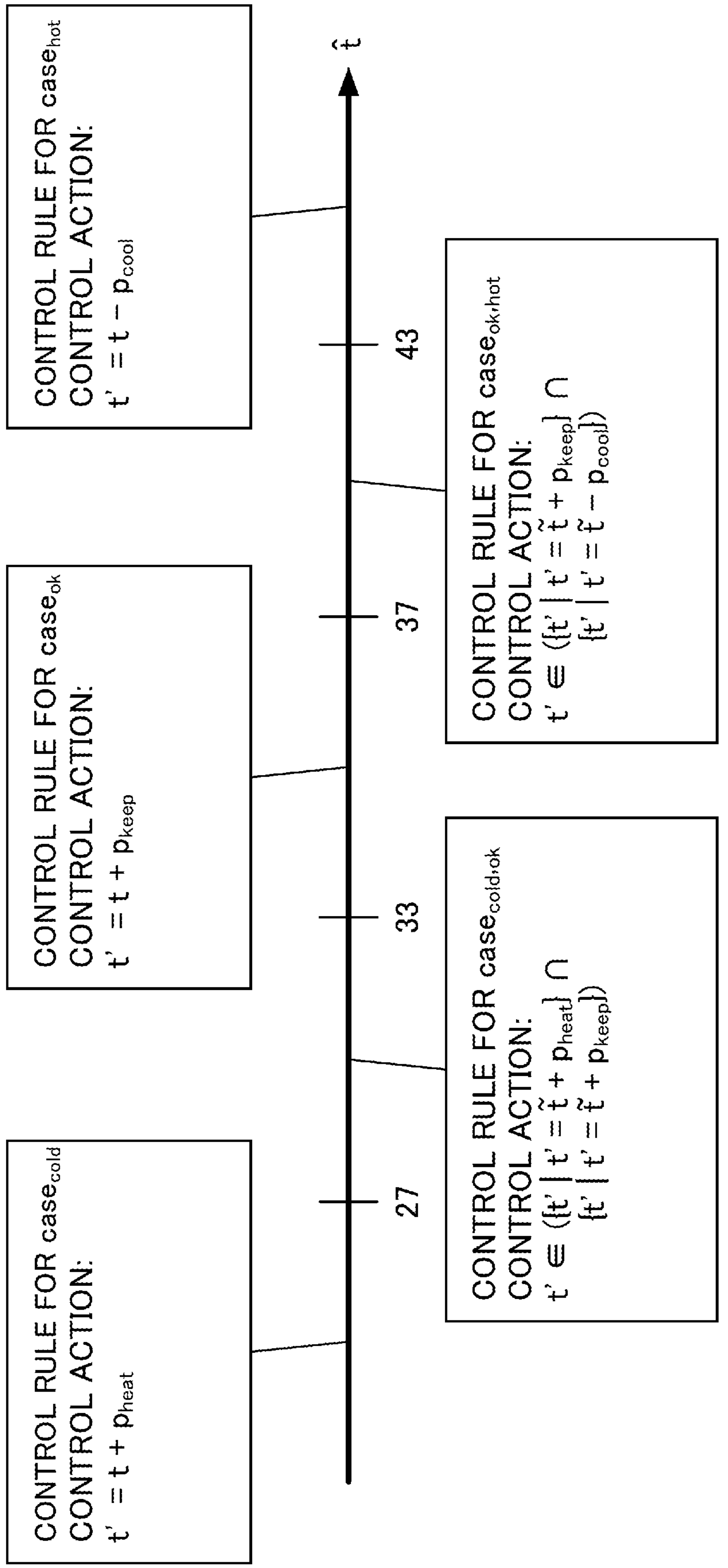
FIG. 12 is a diagram illustrating a specific example of a generation result of a control action according to the first embodiment.

FIG. 12 is a diagram illustrating a specific example of a generation result of the control action according to the first embodiment.

For example, the expression indicating the control action of the control rule for $case_{\{ok,\ hot\}}$ is "$(\{t'|t'=t+p_{keep}\}\cap\{t'|t'=t-p_{cool}\})$".

Figure 13:
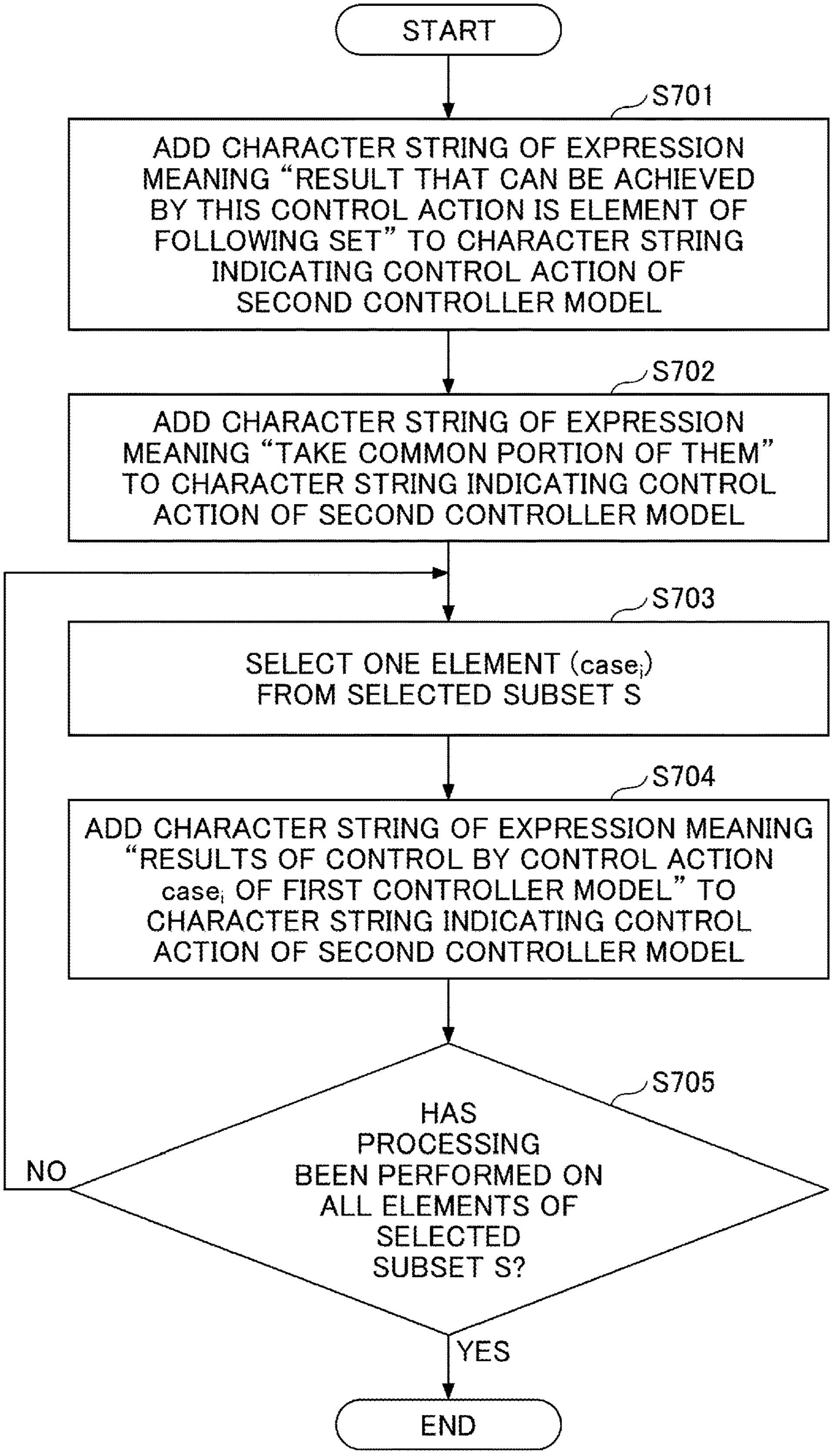
FIG. 13 is a flowchart illustrating an example of a flow of control action character string generation processing.

FIG. 13 is a flowchart illustrating an example of a flow of control action character string generation processing.

The control action generation unit 14 executes control action character string generation processing for generating a character string indicating a control action in the processing of step S602 of the control action generation processing illustrated in FIG. 11.

The control action generation unit 14 adds a character string of an expression meaning "a result that can be achieved by this control action is an element of the following set" to the character string indicating the control action of the second controller model 103 (step S701). In the example of FIG. 12, such a character string corresponds to the character string "$t'\in$" included in the expression indicating the control condition of the control rule for $case_{\{ok,\ hot\}}$.

Next, the control action generation unit 14 adds a character string of an expression meaning "take a common portion of them" to the character string indicating the control action of the second controller model 103 (step S702). Then, the control action generation unit 14 selects one element ($case_i$) from the selected subset S (step S703). Next, the control action generation unit 14 adds a character string of an expression meaning "a set of results of control by the control action $case_i$ of the first controller model" to a character string indicating the control action of the second controller model 103 (step S704). In the example of FIG. 12, the character string "$\{t'|t'=+p_{keep}\}$" corresponds to the added character string related to $case_{ok}$ of $S=\{case_{ok}, case_{hot}\}$.

Next, the control action generation unit 14 determines whether or not the processing has been performed on all the elements of the selected subset S (step S705). When the control action generation unit 14 determines that the processing has not been performed on some element of the subset S (step S705: No), the control action generation unit 14 returns to the processing of step S703 and selects an element that has not yet been selected from among the elements of the selected subset S.

When the control action generation unit 14 determines that the processing has been performed on all the elements of the selected subset S (step S705: Yes), the control action generation unit 14 ends the control action character string generation processing.

As described above, the control action generation unit 14 can mechanically generate the character string indicating the control action included in the second controller model 103 using the character string indicating the control action included in the first controller model 101.

In the present embodiment, the processing of generating character strings indicating the control condition, the parameter restriction, and the control action of the second controller model 103 has been described in the case where the error characteristic information 102 is known. However, the information processing device 10 may perform the above processing on the assumption that the error characteristic is unknown. In this case, the information processing device 10 generates a portion corresponding to a range ($\tilde{t}=[\hat{t}-3, \hat{t}+3]$) of a possible true value $\tilde{t}$ in the above-described character string in a format (e.g., "$\tilde{t}\in R(\hat{t})$") that can be added later. Note that "$R(\hat{t})$" is a range of possible true values with respect to the measurement value $\hat{t}$.

Figure 14:
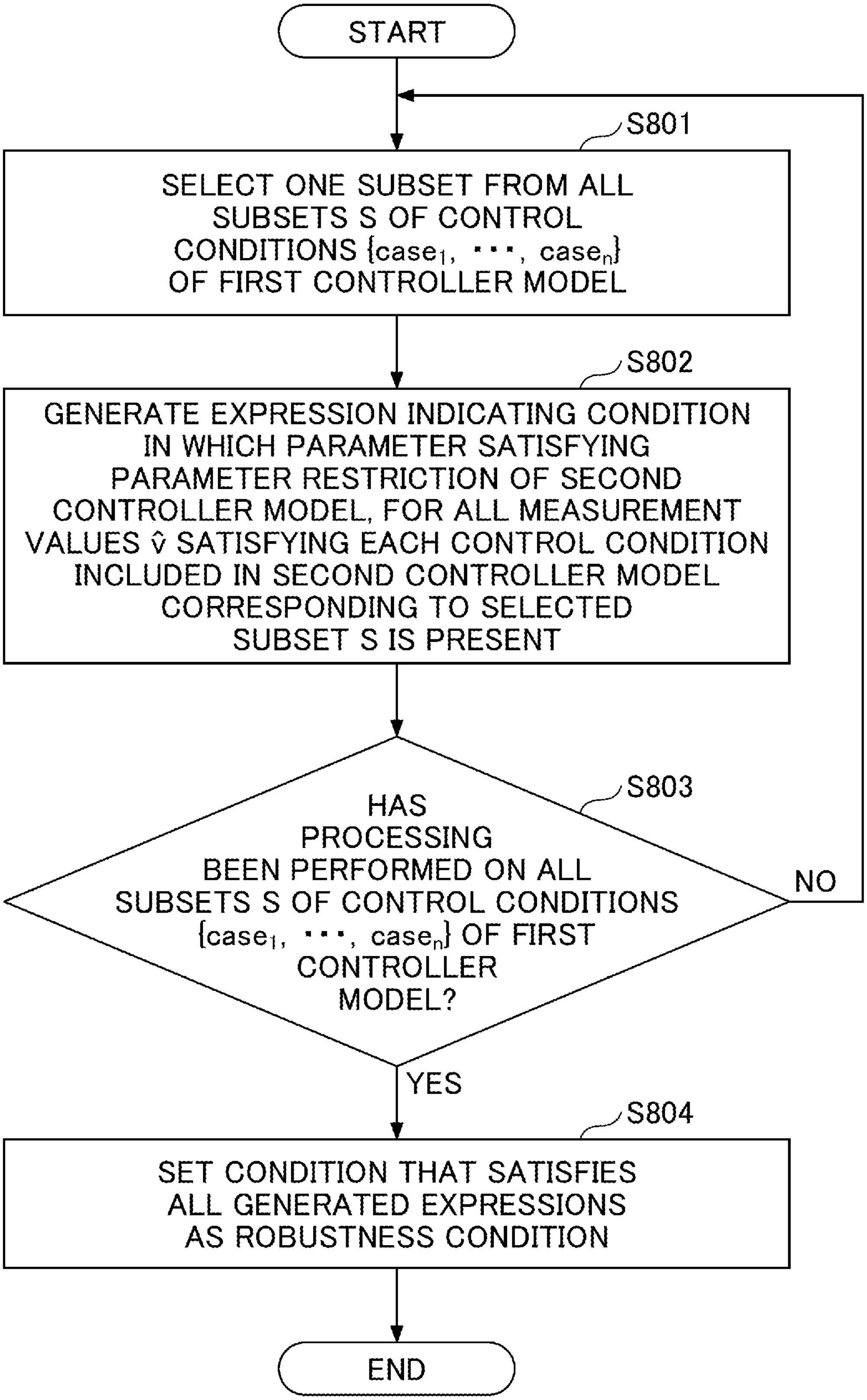
FIG. 14 is a flowchart illustrating an example of a flow of robustness condition generation processing.

FIG. 14 is a flowchart illustrating an example of a flow of robustness condition generation processing.

In step S106 of the control design assistance processing illustrated in FIG. 4, the robustness condition generation unit 16 executes robustness condition generation processing. The robustness condition generation unit 16 selects one subset from all the subsets S of the control conditions $\{case_1, \ldots, case_n\}$ of the first controller model 101 (step S801).

Next, the robustness condition generation unit 16 generates an expression indicating a condition in which a parameter satisfying a parameter restriction of the second controller model 103, for all the measurement values $\hat{v}$ satisfying each control condition included in the second controller model 103 corresponding to the selected subset S is present (step S802).

For example, when the selected subset S is $\{case_{cold}\}$, the robustness condition generation unit 16 generates an expression of "$\vee\hat{t}\cdot((\vee\tilde{t}\in R(\hat{t})\cdot\tilde{t}<30)\Rightarrow(\exists p_{heat}\cdot(\forall\tilde{t}\in R(\hat{t})\cdot(\tilde{t}+p_{heat}\in[30, 40]\vee 0<p_{heat}))))$".

Next, the robustness condition generation unit 16 determines whether or not the processing has been performed on all subsets S of $\{case_1, \ldots, case_n\}$ of the first controller model 101 (step S803). When the robustness condition generation unit 16 determines that processing has not been performed on some subset S of $\{case_1, \ldots, case_n\}$ of the first controller model 101 (step S803: No), the robustness condition generation unit 16 returns to the processing of step S801 and selects a subset S that has not yet been selected.

When the robustness condition generation unit 16 determines that the processing has been performed on all the subsets S of $\{case_1, \ldots, case_n\}$ of the first controller model 101 (Yes at step S803), the robustness condition generation unit 16 sets a condition that satisfies all the generated expressions as a robustness condition (step S804).

As a result, an expression indicating the robustness condition of the second controller model 103 is generated. For example, the expression meaning the robustness condition generated based on the first controller model 101 illustrated in FIG. 3 is as follows:

$$\vee\hat{t}\cdot((\vee\tilde{t}\in R(\hat{t})\cdot\tilde{t}<30)\Rightarrow(\exists p_{heat}\cdot(\forall\tilde{t}\in R(\hat{t})\cdot(\tilde{t}+p_{heat}\in[30,40]\vee 0<p_{heat}))))\wedge$$

$$\ldots$$

$$\vee\hat{t}\cdot((\vee\tilde{t}\in R(\hat{t})\cdot 40\sim t)\Rightarrow(\exists p_{cool}\cdot(\forall\tilde{t}\in R(\hat{t})\cdot(\tilde{t}-p_{cool}\in[30,40]\vee 0<p_{cool}))))$$

In this case, $R(\hat{t})$ satisfying the above-described conditional expression is a range of the measurement errors that can be tolerated by the second controller model 103.

Figure 15:
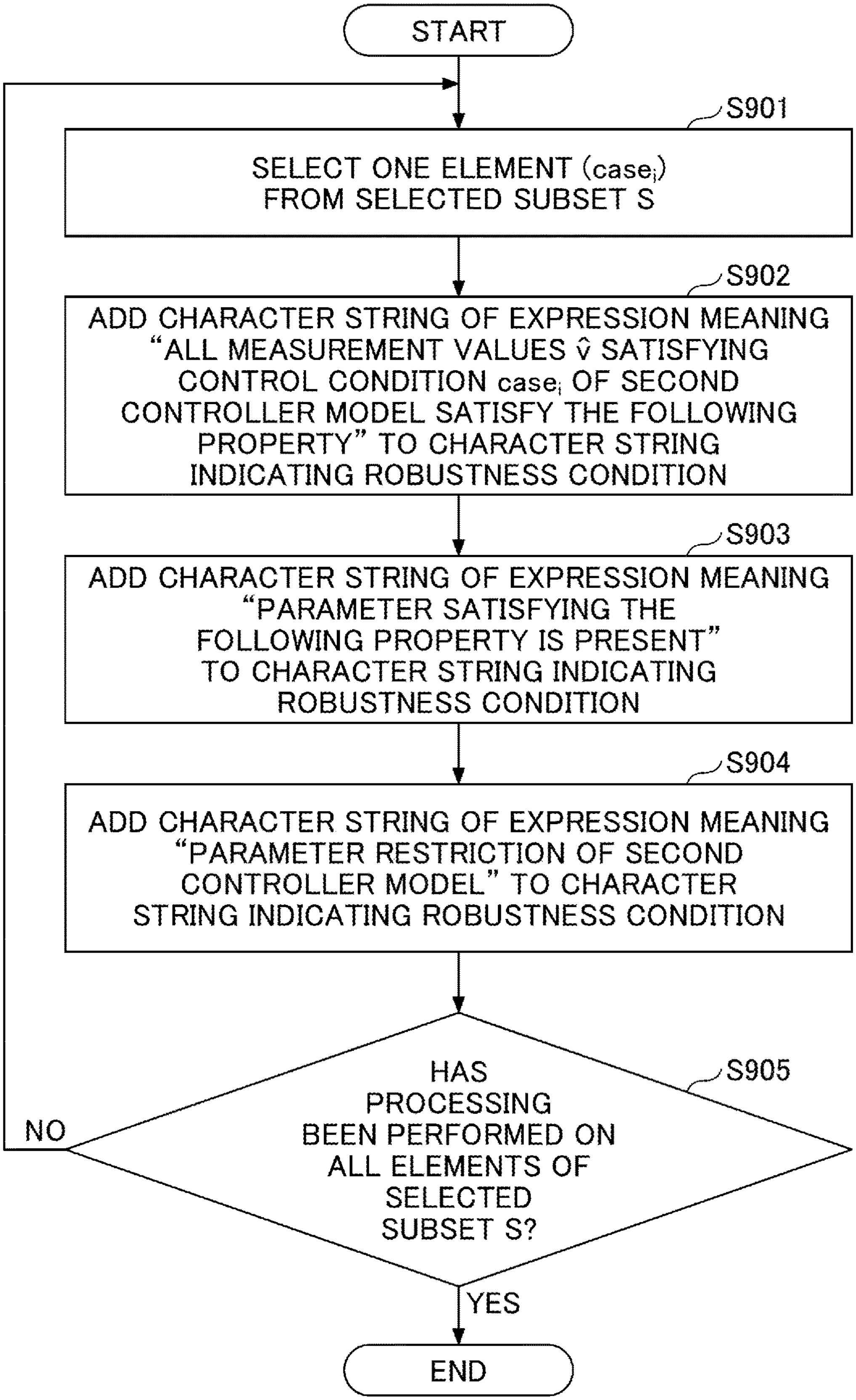
FIG. 15 is a flowchart illustrating an example of a flow of robustness condition character string generation processing.

FIG. 15 is a flowchart illustrating an example of a flow of a robustness condition character string generation process.

The robustness condition generation unit 16 executes robustness condition character string generation processing for generating a character string indicating a robustness condition in the processing of step S802 of the robustness condition generation processing illustrated in FIG. 14.

The robustness condition generation unit 16 selects one element ($case_i$) from the selected subset S (step S901).

The robustness condition generation unit 16 adds a character string of an expression meaning "all the measurement values $\hat{v}$ satisfying the control condition $case_i$ of the second controller model 103 satisfy the following property" to the character string indicating the robustness condition of the second controller model 103 (step S902). When the selected subset S is $case_{hot}$, the result of the processing in step S902 corresponds to a character string "$\forall \hat{t} \cdot ((\forall \tilde{t} \in R(\hat{t}) \cdot 40 < \tilde{t})$" included in the expression indicating the robustness condition generated based on the first controller model 101 illustrated in FIG. 3.

Subsequently, the robustness condition generation unit 16 adds a character string of an expression meaning "a parameter satisfying the following property is present" to the character string indicating the robustness condition of the second controller model 103 (step S903). When the selected subset S is $\{case_{hot}\}$, the result of the processing in step S903 corresponds to a character string "$\exists p_{cool} \in$" included in the expression indicating the robustness condition of the second controller model 103 generated based on the first controller model 101 illustrated in FIG. 3.

Next, the robustness condition generation unit 16 adds a character string of an expression meaning "a parameter restriction of the second controller model" to the character string indicating the robustness condition of the second controller model 103 (step S904). When the selected subset S is $\{case_{hot}\}$, the result of the processing in step S904 corresponds to a character string "$(\forall \tilde{t} \in R(\hat{t}) \cdot (\tilde{t} - p_{cool} \in [30, 40] \wedge 0 < p_{cool}))$" included in the expression indicating the robustness condition generated based on the first controller model 101 illustrated in FIG. 3.

Next, the robustness condition generation unit 16 determines whether or not the processing has been performed on all the elements of the selected subset S (step S905). When the robustness condition generation unit 16 determines that the processing has not been performed on some element of the subset S (step S905: No), the robustness condition generation unit 16 returns to the processing of step S901 and selects an element that has not been selected from the selected subset S.

When the robustness condition generation unit 16 determines that all the elements of the selected subset S have been processed (step S905: Yes), the robustness condition generation unit 16 ends the robustness condition character string generation processing.

In this manner, the robustness condition generation unit 16 can mechanically generate a character string indicating the robustness included in the robustness condition data 104, that is, a condition serving as a limit of a tolerable measurement error, using a character string indicating a control condition, a parameter restriction, and the like generated as the second controller model 103.

Traditionally, it has been difficult to design and construct a formal model that can tolerate measurement errors from scratch. This is because when a measurement error is included, elements of a model, considerations, and the like are greatly increased, and it is necessary to mathematically prove that safety is satisfied for each of the increased elements.

In contrast, according to the information processing device 10 according to the present embodiment, the second controller model 103 is generated based on the first controller model 101 and the error characteristic information 102. As a result, it is possible to provide a controller model that can tolerate measurement errors.

The information processing device 10 uses the character string defining the operation of the first controller model 101 to generate a character string defining the action of the second controller model 103 by mechanical processing. This makes it possible to easily construct a controller model that can tolerate measurement errors without relying on human skills.

In general, a characteristic of the measurement error is not clear at the design stage and depend on the environment of the control target. Therefore, it is difficult to analyze a limit of error that the controller can tolerate before constructing the controller model. Therefore, there is a demand for analyzing a limit of an error that can be tolerated by a controller model after constructing the controller model and selecting a sensor or the like.

In response to such a demand, it has been difficult to derive a limit of error. On the other hand, according to the present embodiment of the information processing device 10, the second controller model 103 is generated in a state in which the error characteristic is unknown, and the robustness condition data 104 indicating the condition serving as a limit of the measurement error that can be tolerated by the second controller model 103 is generated. This makes it easier to analyze the limit of error that can be tolerated by the controller model after the controller model has been constructed.

In addition, the information processing device 10 according to the present embodiment mechanically generates character strings indicating the control condition, the parameter restriction, and the control action of the second controller model 103 by connecting the character strings indicating the control condition, the parameter restriction, and the control action of the first controller model 101, using symbols representing meanings such as "and", "or", "for all . . . satisfying the following property", and "a certain . . . satisfying the following property is present". Herein, since the symbols used for the connection are general symbols that do not depend on a specific notation, the information processing device 10 can make use of the notation of the first controller model 101 to be processed and can handle a controller model that is not limited to a specific notation. For example, the information processing device 10 is also applicable to a case where the first controller model is stated in a natural language.

The information processing device 10 may be configured to be able to store a part of the notation as a setting value in order to absorb a fine difference in the notation. For example, although an example in which a logical symbol indicating the meaning of "or" is "$\vee$" has been described in the present embodiment, the logical symbol may be stored as a setting value and may be set to "or", "|", or the like.

Next, as a specific example of the present embodiment, an example of a controller of a self-driving vehicle will be described as an example different from the controller of the temperature of the hot spring bath described above.

There are standard safety rules for self-driving vehicles called RSS (Responsibility-Sensitive Safety) (e.g., Non-Patent Document 2).

In the RSS, rules that the self-driving vehicles are responsible for keeping for safety are defined for each situation. For example, the definition of d_min is stated in the RSS together with a rule that "a self-driving vehicle traveling in a situation in which another vehicle is in front of the self-driving vehicle needs to have a minimum inter-vehicle distance d_min from the vehicle in front of the self-driving vehicle".

As long as a certain self-driving vehicle adheres to the rules stated in the RSS, the self-driving vehicle can be considered to be fulfilling responsibilities, and cause and responsibility can be externally appreciable even in the event of an accident in the event of an accident. In addition, when a control software S is constructed so as to reliably follow the rules stated in the RSS, it can be guaranteed that S behaves safely in the RSS.

For example, a model M of S is constructed in which a safety condition that "an action of M needs to satisfy an inter-vehicle distance d_min to a preceding vehicle", and a control rule including an ignition condition, a parameter restriction, and a control action, such as "M decelerates at an acceleration $-f(\delta)$ when a distance to the preceding vehicle is d, $d=d\_min+\delta$, and $\delta<\varepsilon$" are stated. Then, when it is verified that the control rule of M satisfies the safety condition of M, it can be guaranteed that M behaves safely in RSS.

However, since a measurement error is not taken into consideration in RSS, S should be safe when there is no measurement error, but safety may not be satisfied when there is a measurement error. For example, in the above-described model M, the control rule and the acceleration to be used are determined according to the distance to the preceding vehicle, but when there is a measurement error in the distance, an appropriate control rule and an appropriate acceleration cannot be determined.

To address this problem, it is desirable to change S so that S be robust against measurement errors. In this case, a user sets S as the first controller model 101 (M), and inputs information indicating what kind of measurement error is possible for each variable of S as error information to the information processing device 10.

For example, the first controller model acquisition unit 11 may read a file of M recorded in an auxiliary storage device into a memory device in a structured form, convert the file into a processable form, and display the content of M on the display device. As a result, a set of variables, a safety condition, and control rules stated in M are displayed on the display device.

Subsequently, the first controller model acquisition unit 11 may display, on the display device, a prompt requesting input of information about what kind of measurement error may be present for each variable of S, receive input from the user, and read the input into the memory device as error characteristic information.

Subsequently, the control condition generation unit 12, the parameter restriction generation unit 13, and the control action generation unit 14 newly generate a new control rule list for allowing M to behave so as to satisfy the safety condition of M even under the received error characteristics, and hold the new control rule list in the memory device as the second controller model 103.

The new control rule described in the second controller model 103 generated in this way is obtained by improving the old control rule stated in the first controller model 101 (M) so that, for example, even when there is an error in the measurement of the distance to the preceding vehicle, it is possible to keep the inter-vehicle distance that is defined by the RSS and is responsible for keeping.

Then, the second controller model output unit 15 may display the second controller model 103 held in the memory device on the display device and record it in the auxiliary storage device.

Furthermore, the robustness condition generation unit 16 generates a robustness condition and holds it in the memory device as robustness condition data 104.

Subsequently, the robustness condition data output unit 17 may display the robustness condition data 104 held in the memory device on the display device and record the data in the auxiliary storage device.

According to the present embodiment, a controller model is generated taking measurement errors into account, based on the model M of the control software S that reliably follows the rules stated in the RSS applied to the self-driving vehicle.

Second Embodiment

Hereinafter, a second embodiment will be described with reference to the drawings. The second embodiment is different from the first embodiment in that an action different from the action of the first controller model 101 is allowed in generation of an expression indicating a parameter restriction of the second controller model 103. Therefore, in the following description of the second embodiment, the difference from the first embodiment will be mainly described, and elements having the same functional configurations as those of the first embodiment will be denoted by the same reference numerals as those used in the description of the first embodiment, and description thereof will be omitted.

Figure 16:
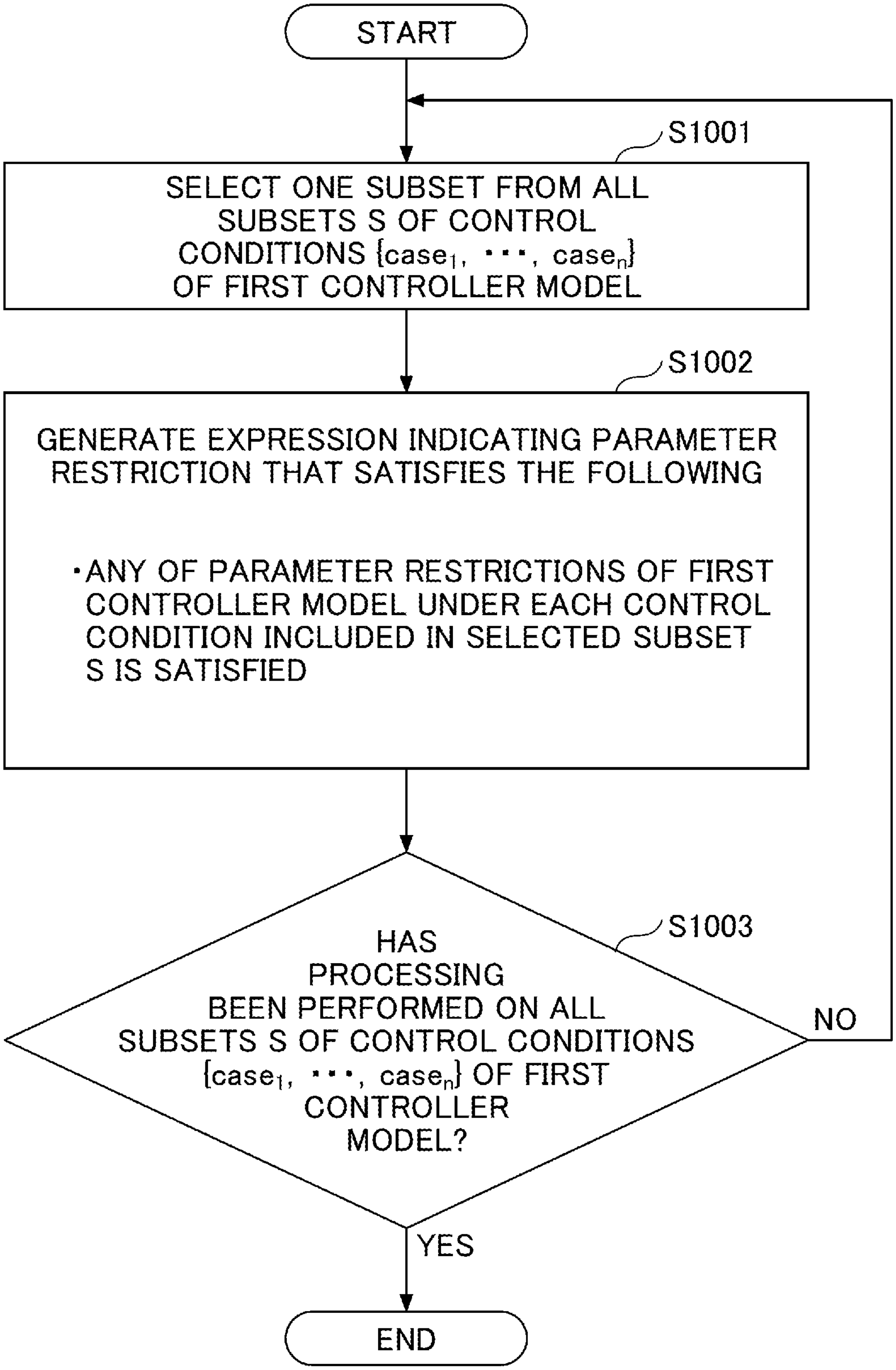
FIG. 16 is a flowchart illustrating an example of a flow of parameter restriction generation processing according to the second embodiment.

FIG. 16 is a flowchart illustrating an example of a flow of parameter restriction generation processing according to the second embodiment.

The parameter restriction generation processing according to the present embodiment is similar to the parameter restriction generation processing according to the first embodiment, and generates an expression indicating a more moderate restriction. More specifically, the parameter restriction generation processing according to the present embodiment is different from the parameter restriction generation processing according to the first embodiment in that a condition to be satisfied by the parameter restriction in step S1002 illustrated in FIG. 16 is as follows.

Any of the parameter restrictions of the first controller model 101 under each control condition included in the selected subset S is satisfied.

In the first embodiment, the condition satisfies all the parameter restrictions of the first controller model 101, but in the present embodiment, the condition satisfies any of the parameter restrictions of the first controller model 101. Note that, as will be described later, the control action of the second controller model 103 under each control condition is any one of the control actions of the first controller model 101. Therefore, when the parameter satisfies the parameter restriction, the safety condition is satisfied. Therefore, in the present embodiment, the condition corresponding to (b) of the first embodiment is not necessary.

Accordingly, the parameter restriction generated in the present embodiment may be a more moderate restriction than in the first embodiment.

FIG. 17 is a diagram illustrating a specific example of a parameter restriction generation result according to the second embodiment.

As a generation result of the parameter restriction according to the present embodiment, for example, an expression indicating a parameter restriction of the parameters ($p_{keep}$, $p_{cool}$) of the control rule for $case_{\{ok,\ hot\}}$ is "$(\forall \tilde{t} \in [\hat{t}-3, \hat{t}+3] \cdot (t+p_{keep}=[30, 40] \wedge p_{keep} \in [-6, 6])) \vee (\forall \tilde{t} \in [\hat{t}-3, \hat{t}+3] \cdot (t-p_{cool} \in [30,40] \wedge 0<p_{cool}))$".

Figure 18:
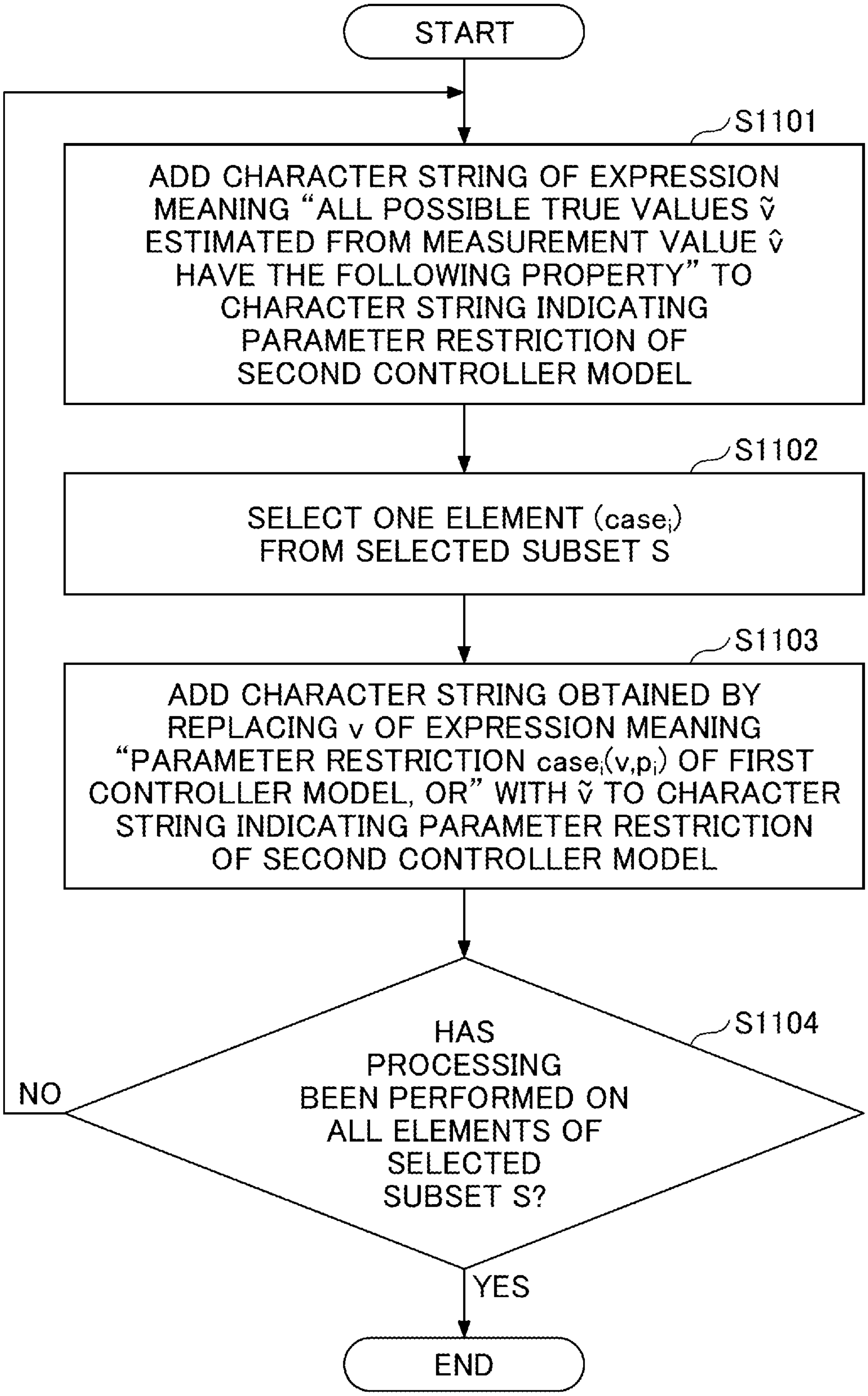
FIG. 18 is a flowchart illustrating an example of a flow of parameter restriction character string generation processing according to the second embodiment.

FIG. 18 is a flowchart illustrating an example of a flow of parameter restriction character string generation processing according to the second embodiment.

In the parameter restriction character string generation processing according to the present embodiment, the parameter restriction generation unit 13 adds a character string of an expression meaning "all the possible true values ~v estimated from the measurement value ^v have the following property" to the character string indicating the parameter restriction of the second controller model 103 (step S1101). In the example of FIG. 17, a result of the processing of step S1101 corresponds to a character string "$\vee \tilde{t} \in [\hat{t}-3, \hat{t}+3] \cdot$" included in the expression indicating the control condition of the control rule for $case_{\{ok,\ hot\}}$.

Next, the parameter restriction generation unit 13 selects one element ($case_i$) from the selected subset S (step S1102).

Next, the parameter restriction generation unit 13 adds a character string obtained by replacing v in an expression meaning "a parameter $case_i$ (v, $p_i$) of the first controller model 101, or" with ~v to the character string indicating the parameter restriction of the second controller model 103 (step S1103). As a result of the processing of step S1103, in the example of FIG. 9, the character string "$(t+p_{keep} \in [30, 40] \wedge p_{keep} \in [-6, 6]) \vee$" included in the expression indicating the control condition of the control rule for $case_{\{ok,\ hot\}}$ corresponds to the added character string related to $case_{ok}$ in $S=\{case_{ok}, case_{hot}\}$. However, "or" is omitted when the processing of step S1103 is executed last.

Next, the parameter restriction generation unit 13 determines whether or not the processing has been performed on all the elements of the selected subset S (step S1104). When the parameter restriction generation unit 13 determines that the processing has not been performed on some element of the subset S (step S1104: No), the parameter restriction generation unit 13 returns to the processing of step S1101.

When the parameter restriction generation unit 13 determines that all the elements of the selected subset S have been processed (step S1104: Yes), the parameter restriction generation unit 13 ends the parameter restriction character string generation processing.

In the first embodiment, the expression indicating the control action of the second controller model 103 is an expression indicating an action common to the control actions of all the elements of the subset S. On the other hand, in the present embodiment, the expression indicating the control action of the second controller model 103 is an expression indicating any action among the control actions of the elements of the subset S.

Figure 19:
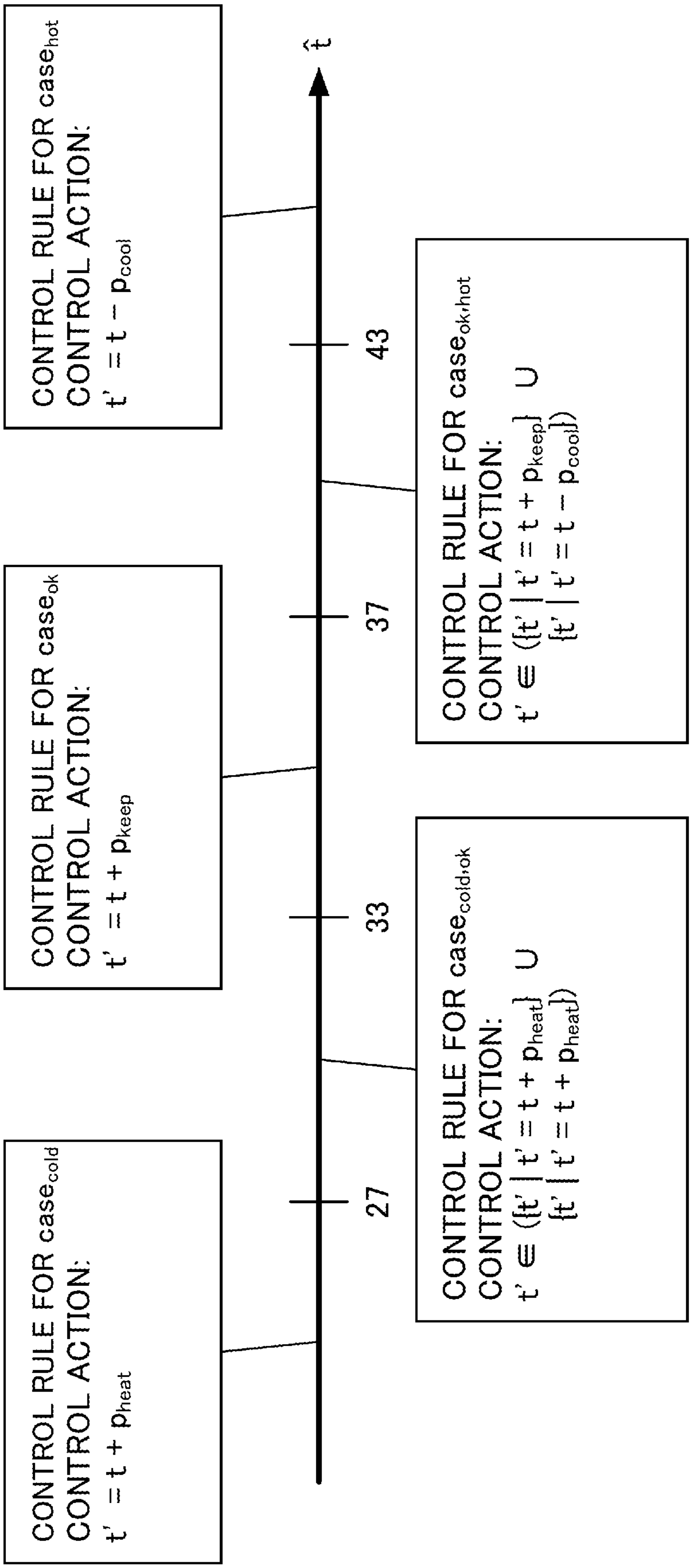
FIG. 19 is a diagram illustrating a specific example of a generation result of a control action according to the second embodiment.

FIG. 19 is a diagram illustrating a specific example of a generation result of a control action according to the second embodiment.

For example, an expression indicating the control action of the control rule for $case_{\{ok,\ hot\}}$ is "$(t' \in (\{t' | t'=t+p_{keep}\} \cup \{t' | t'=t-p_{cool}\}$".

Figure 20:
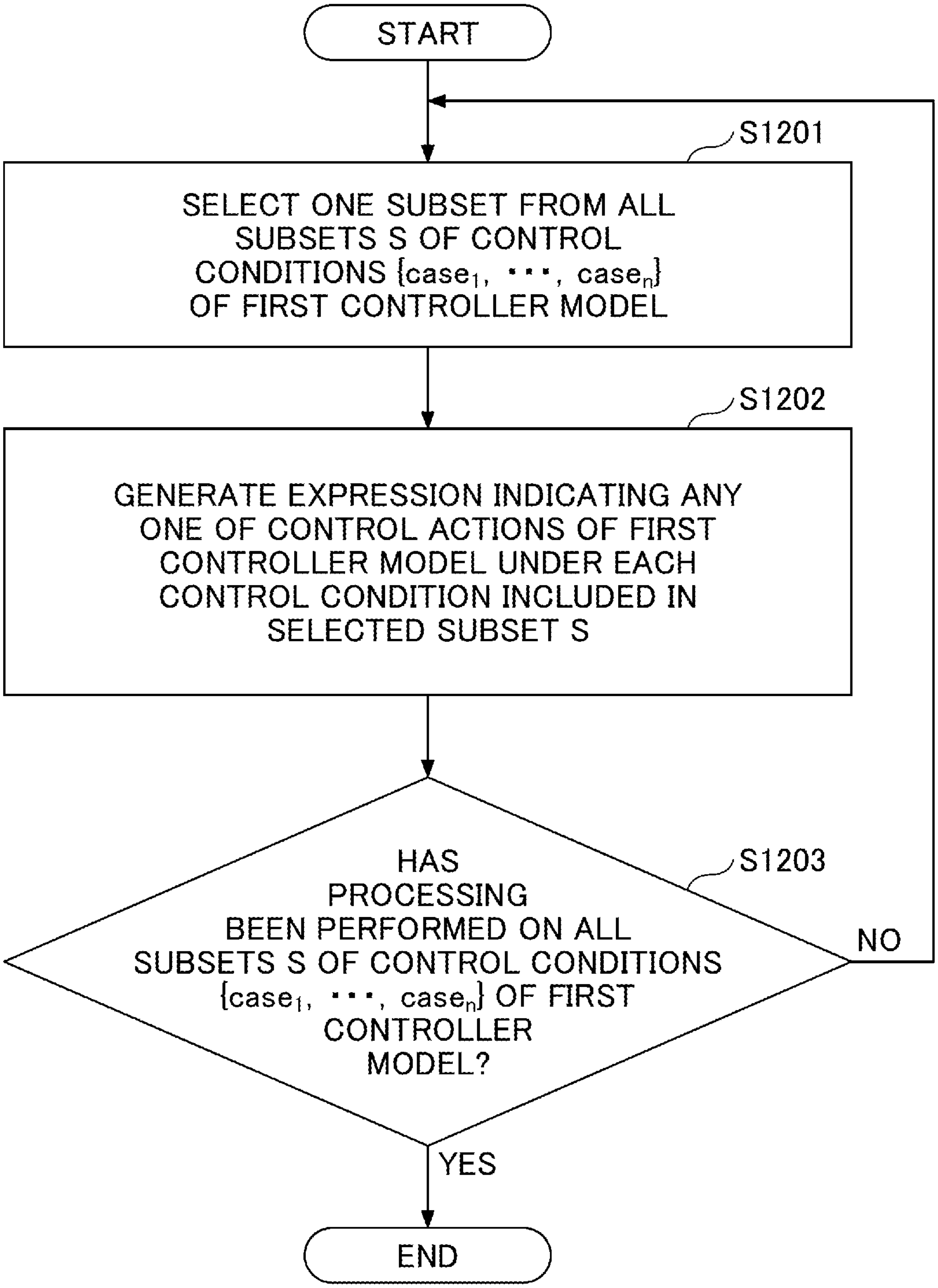
FIG. 20 is a flowchart illustrating an example of a flow of control action generation processing according to the second embodiment.

FIG. 20 is a flowchart illustrating an example of a flow of control action generation processing according to the second embodiment.

In step S1202 of the control action generation processing according to the present embodiment, the control action generation unit 14 generates an expression indicating any one of the control actions of the first controller model 101 under each control condition included in the selected subset S.

The parameter restriction according to the first embodiment is a parameter restriction for faithfully reproducing the control action according to the first controller model 101. Therefore, the range of tolerable measurement errors becomes small, which may not be tolerated in the practical use.

In contrast, the parameter restriction according to the present embodiment may allow the range to extend up to a larger range of measurement errors to be tolerated by lowering the reproducibility of some of the control actions. Since the parameter restriction according to the present embodiment is required to satisfy any of the parameter restrictions included in the first controller model 101, a constraint that satisfies the safety condition is maintained. Therefore, in the present embodiment, the safety is guaranteed as in the first embodiment.

Specifically, there may be a case where the parameter restriction in the first controller model 101 includes a constraint stricter than the safety condition due to environmental consideration or the like. In this case, the parameter restriction generation unit 13 according to the first embodiment generates an expression indicating a parameter restriction that satisfies such a constraint stricter than the safety condition. On the other hand, the parameter restriction generation unit 13 according to the second embodiment generates an expression indicating a parameter restriction that does not satisfy the constraint stricter than the safety condition in some actions. Thus, it is possible to construct the second controller model 103 with improved practicality.

In the above-described embodiments, the example of the controller model including the parameter restriction as an element independent of the control condition and the control action is illustrated, but the parameter restriction may be included in the control condition or the control action.

Hardware Configuration Example According to Present Embodiments

The information processing device 10 can be implemented by, for example, causing a computer to execute a program in which processing contents described in the present embodiments are stated. Note that the "computer" may be a physical machine or a virtual machine on a cloud. When a virtual machine is used, the "hardware" described herein is virtual hardware.

The program may be recorded in a computer-readable recording medium (such as a portable memory) to be stored or distributed. It is also possible to provide the program through a network such as the Internet or email.

Figure 21:
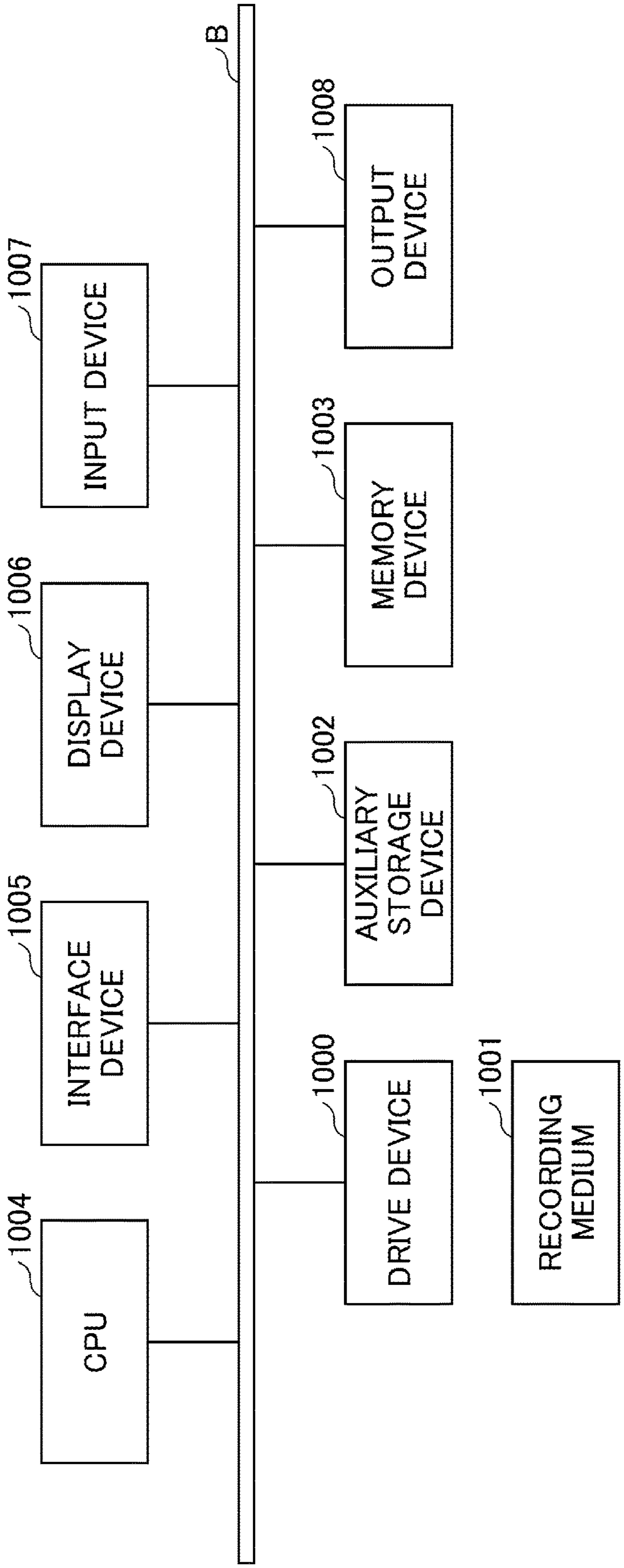
FIG. 21 is a diagram illustrating an example of a hardware configuration of a computer.

FIG. 21 is a diagram illustrating a hardware configuration example of a computer. The computer illustrated in FIG. 21 includes a drive device 1000, an auxiliary storage device 1002, a memory device 1003, a CPU 1004, an interface device 1005, a display device 1006, an input device 1007, and an output device 1008, which are connected to each other via a bus B.

A program for implementing processing in the computer is provided by a recording medium 1001 such as a CD-ROM or a memory card. When the recording medium 1001 storing the program is set in the drive device 1000, the program is installed from the recording medium 1001 to the auxiliary storage device 1002 via the drive device 1000. However, it is not always necessary to install the program from the recording medium 1001, and the program may be downloaded from another computer via a network. The auxiliary storage device 1002 stores the installed program and also stores necessary files, data, and the like.

Upon receiving an instruction to start the program, the memory device 1003 reads out the program from the auxiliary storage device 1002 and stores the program. The CPU 1004 realizes a function related to the device according to a program stored in the memory device 1003. The interface device 1005 is used as an interface for connecting to a network. The display device 1006 displays a graphical user interface (GUI) or the like according to a program. The input device 1007 includes a keyboard and a mouse, buttons, a touch panel, or the like, and is used to input various operation instructions. The output device 1008 outputs the calculation result.

The computer may include a graphics processing unit (GPU) or a tensor processing unit (TPU) instead of the CPU 1004, or may include a GPU or a TPU in addition to the CPU 1004. In this case, processing may be shared and executed such that the GPU or the TPU executes processing that requires a special arithmetic operation and the CPU 1004 executes the other processing.

Although the present embodiments have been described above, the present invention is not limited to the specific embodiments, and various modifications and changes can be made within the scope of the gist of the present invention described in the claims.

The information processing device and the program according to the present embodiment may be configured as an information processing device and a program described in the following items. Further, the following control design assistance method may be implemented.

Configuration Related to Present Embodiments (Item 1)

An information processing device designed for outputting, based on a first controller model, a second controller model capable of tolerating a measurement value including a measurement error, the first controller model including information indicating a control condition based on a measurement value and information indicating a control action defining an action of a control target when the control condition is satisfied, the information processing device comprising:

- a control condition generation unit configured to generate information indicating a control condition included in the second controller model based on the information indicating the control condition included in the first controller model; and
- a control action generation unit configured to generate information indicating a control action included in the second controller model based on information indicating the control condition and the control action included in the first controller model.

(Item 2)

The information processing device according to item 1,

- wherein the control condition generation unit selects one subset from all subsets of the control conditions included in the first controller model, and generates information indicating a condition that all possible true values estimated from a measurement value are included in the selected subset.

(Item 3)

The information processing device according to item 1 or 2,

- wherein the control action generation unit selects one subset from all subsets of the control conditions included in the first controller model, and generates information indicating an action common to all control actions of the first controller model under each control condition included in the selected subset.

(Item 4)

The information processing device according to any one of items 1 to 3,

- wherein the first controller model further includes information indicating a parameter restriction indicating a condition to be satisfied by a parameter included in the control action, and
- wherein the information processing device further comprises:
- a parameter restriction generation unit configured to generate information indicating a parameter restriction included in the second controller model, based on the information indicating the control condition, the parameter restriction, and the control action included in the first controller model.

(Item 5)

The information processing device according to item 4,

- wherein the first controller model includes information indicating a safety condition that is a condition of safety to be guaranteed, and
- wherein the parameter restriction generation unit selects one subset from all subsets of the control conditions included in the first controller model, and generates information indicating a parameter restriction that all parameter restrictions of the first controller model under each control condition included in the selected subset are satisfied, an action common to the control actions of the first controller model corresponding to all the control conditions included in the selected subset is present, and the safety condition is satisfied in a state controlled by the common action.

(Item 6)

The information processing device according to item 1 or 2,

- wherein the first controller model further includes information indicating a parameter restriction indicating a condition to be satisfied by a parameter included in the control action and information indicating a safety condition that is a condition of safety to be guaranteed, to item 1 or 2,
- wherein the information processing device further comprises:
- a parameter restriction generation unit configured to select one subset from all subsets of the control conditions included in the first controller model and generate information indicating a parameter restriction that any of the parameter restrictions of the first controller model under each control condition included in the selected subset is satisfied, and
- wherein the control action generation unit selects one subset from all subsets of the control conditions included in the first controller model, and generates an expression indicating any one of the control actions of the first controller model under each control condition included in the selected subset.

(Item 7)

The information processing device according to any one of items 4 to 6,

- wherein information indicating the control condition, the parameter restriction, and the control action included in the second controller model is generated in a format in which a characteristic of the measurement error is capable of being added later.

(Item 8)

The information processing device according to any one of items 4 to 6, wherein information indicating the control condition, the parameter restriction, and the control action included in the second controller model is generated based on information indicating a characteristic of the measurement error.

(Item 9)

The information processing device according to any one of items 4 to 8, further comprising:

a robustness condition generation unit configured to generate robustness condition data indicating a condition serving as a limit of a tolerable measurement error of the second controller model, based on information indicating the control condition and the parameter restriction included in the second controller model.

(Item 10)

The information processing device according to item 9, wherein the robustness condition generation unit selects one subset from all subsets of the control conditions included in the first controller model, and generates, as the robustness condition data, information indicating that a condition, in which a parameter satisfying the parameter restriction included in the second controller model for all measurement values satisfying each control condition included in the second controller model corresponding to the selected subset is present, is satisfied for all the subsets.

(Item 11)

A control design assistance method executed by an information processing device, the information processing device being designed for outputting, based on a first controller model, a second controller model capable of tolerating a measurement value including a measurement error, and the first controller model including information indicating a control condition based on a measurement value and information indicating a control action defining an action of a control target when the control condition is satisfied, the control design assistance method comprising:

generating information indicating a control condition included in the second controller model based on the information indicating the control condition included in the first controller model; and generating information indicating a control action included in the second controller model based on information indicating the control condition and the control action included in the first controller model.

(Item 12)

A program for causing a computer included in an information processing device to perform a process, the information processing device being designed for outputting, based on a first controller model, a second controller model capable of tolerating a measurement value including a measurement error, and the first controller model including information indicating a control condition based on a measurement value and information indicating a control action defining an action of a control target when the control condition is satisfied, the process comprising:

generating information indicating a control condition included in the second controller model based on the information indicating the control condition included in the first controller model; and generating information indicating a control action included in the second controller model based on information indicating the control condition and the control action included in the first controller model.

As described above, the embodiments of the present invention have been described in detail; note that the present invention is not limited to the specific embodiments described above, and various modifications and changes can be made within the scope of the gist of the present invention set forth in the claims.

What is claimed is:

1. An information processing device comprising:

a memory; and a processor configured to execute a process including:

acquiring a first controller model, the first controller model including information indicating a safety condition to be satisfied, and one or more control rules, each control rule including information indicating a control condition based on a measurement value, and information indicating a control action defining an action of a control target, the control action being executed when the control condition is satisfied; and outputting a second controller model, the second controller model being capable of tolerating a measurement value including a measurement error, wherein the second controller model includes information indicating a control condition based on the information indicating the control condition included in the first controller model, and information indicating a control action based on the information indicating the control condition and the information indicating the control action included in the first controller model.

2. The information processing device according to claim 1, wherein the process further includes:

selecting one subset from all subsets of the control conditions included in the one or more control rules of the first controller model, and generating information indicating a condition that all possible true values estimated from a measurement value are included in the selected subset, as information indicating the control condition included in the second controller model.

3. The information processing device according to claim 1, wherein the process further includes:

selecting one subset from all subsets of the control conditions included in the one or more control rules of the first controller model, and generating information indicating an action common to all control actions of the first controller model under each control condition included in the selected subset, as information indicating the control action included in the second controller model.

4. The information processing device according to claim 1, wherein each of the one or more control rules of the first controller model further includes information indicating a parameter restriction indicating a condition to be satisfied by a parameter included in the control action, and wherein the process further includes:

generating information indicating a parameter restriction included in the second controller model, based on information indicating the control condition, the parameter restriction, and the control action included in the first controller model.

5. The information processing device according to claim 4, wherein the generating information indicating a parameter restriction includes selecting one subset from all subsets of the control conditions included in the one or more control rules of the first controller model, and generating information indicating a parameter restriction indicating that all parameter restrictions of the first controller model under each control condition included in the selected subset are satisfied, an action common to the control action of the first controller model corresponding to all the control conditions included in the selected subset is present, and the safety condition is satisfied in a state controlled by the common action.

6. The information processing device according to claim 1, wherein each of the one or more control rules of the first controller model further includes information indicating a parameter restriction indicating a condition to be satisfied by a parameter included in the control action, and information indicating a safety condition that is a condition of safety to be guaranteed, and wherein the process further includes:

selecting one subset from all subsets of the control conditions included in the one or more control rules of the first controller model, and generating, as information included in the second controller model, information indicating a parameter restriction that any of the parameter restrictions of the first controller model under each control condition included in the selected subset is satisfied; and selecting one subset from all subsets of the control conditions included in the one or more control rules of the first controller model, and generating, as information indicating the control action included in the second controller model, an expression indicating any one of the control actions of the first controller model under each control condition included in the selected subset.

7. The information processing device according to claim 4, wherein information indicating the control condition, the parameter restriction, and the control action included in the second controller model is generated in a format in which a characteristic of the measurement error is capable of being added later.

8. The information processing device according to claim 4, wherein information indicating the control condition, the parameter restriction, and the control action included in the second controller model is generated based on information indicating a characteristic of the measurement error.

9. The information processing device according to claim 4, wherein the process further includes:

outputting robustness condition data indicating a condition serving as a limit of a tolerable measurement error of the second controller model based on information indicating the control condition and the parameter restriction included in the second controller model.

10. The information processing device according to claim 9, wherein the process further includes:

a robustness condition generation unit configured to select one subset from all subsets of the control conditions included in the one or more control rules of the first controller model, and generate, as the robustness condition data, information indicating that a condition, in which a parameter satisfying the parameter restriction included in the second controller model for all measurement values satisfying each control condition included in the second controller model corresponding to the selected subset is present, is satisfied for all the subsets.

11. A control design assistance method executed by a computer included in an information processing device, the computer including a memory and a processor, the control design assistance method comprising:

acquiring a first controller model, the first controller model including information indicating a safety condition to be satisfied, and one or more control rules, each control rule including information indicating a control condition based on a measurement value, and information indicating a control action defining an action of a control target, the control action being executed when the control condition is satisfied; and outputting a second controller model, the second controller model being capable of tolerating a measurement value including a measurement error, wherein the second controller model includes information indicating a control condition based on the information indicating the control condition included in the first controller model, and information indicating a control action based on the information indicating the control condition and the information indicating the control action included in the first controller model.

12. A non-transitory computer-readable recording medium storing a program, which when executed by a processor of a computer included in an information processing device, causes the information processing device to perform a process comprising:

acquiring a first controller model, the first controller model including information indicating a safety condition to be satisfied, and one or more control rules, each control rule including information indicating a control condition based on a measurement value, and information indicating a control action defining an action of a control target, the control action being executed when the control condition is satisfied; and outputting a second controller model, the second controller model being capable of tolerating a measurement value including a measurement error, wherein the second controller model includes information indicating a control condition based on the information indicating the control condition included in the first controller model, and information indicating a control action based on the information indicating the control condition and the information indicating the control action included in the first controller model.

* * * * *